(12) United States Patent
Chen

(10) Patent No.: US 8,876,169 B2
(45) Date of Patent: Nov. 4, 2014

(54) CAM-LOCK ACTUATING DEVICE FOR USE IN A LOCKING COUPLING ASSEMBLY THAT COUPLES TWO TUBULAR MEMBERS

(76) Inventor: Waterson Chen, Taichung (TW)

( * ) Notice: Subject to any disclaimer, the term of this patent is extended or adjusted under 35 U.S.C. 154(b) by 135 days.

(21) Appl. No.: 13/368,991

(22) Filed: Feb. 8, 2012

(65) Prior Publication Data

US 2013/0106095 A1    May 2, 2013

(51) Int. Cl.
 *F16L 37/18*    (2006.01)
(52) U.S. Cl.
 CPC ...................................... *F16L 37/18* (2013.01)
 USPC ............................. 285/312; 285/87; 285/394
(58) Field of Classification Search
 USPC .................... 285/85, 87–88, 308, 312, 394
 See application file for complete search history.

(56) References Cited

U.S. PATENT DOCUMENTS

| | | | | |
|---|---|---|---|---|
| 4,519,635 A | * | 5/1985 | McMath | .......................... 285/93 |
| 4,618,171 A | * | 10/1986 | Fahl | ............................... 285/93 |
| 4,802,694 A | | 2/1989 | Vargo | |
| 5,368,343 A | * | 11/1994 | Allen | ............................. 285/312 |
| 5,904,380 A | * | 5/1999 | Lee | ................................. 285/312 |
| 5,911,445 A | * | 6/1999 | Lee | ................................... 285/84 |
| 2011/0095525 A1 | | 4/2011 | Eich | |

FOREIGN PATENT DOCUMENTS

EP            0615090 A1      9/1994

* cited by examiner

*Primary Examiner* — Aaron Dunwoody
*Assistant Examiner* — Fannie Kee
(74) *Attorney, Agent, or Firm* — Stroock & Stroock & Lavan LLP

(57) ABSTRACT

A cam-lock actuating device for use in a locking coupling assembly that couples two tubular members, includes an actuatable lever having a head pivotally mounted on a female tubular coupler, an angularly positioning member coupled to be turned with the head, and leading and trailing releasably retaining members independently disposed on at least one of the head and the angularly positioning member such that, during turning of the actuatable lever to an unlocked position, the trailing releasably retaining member can be held in partially locking engagement with a male tubular coupler to prevent complete removal of the male tubular coupler from the female tubular coupler while permitting gradual relief of internal pressure.

4 Claims, 45 Drawing Sheets

CAM-LOCK ACTUATING DEVICE FOR USE IN A LOCKING COUPLING ASSEMBLY THAT COUPLES TWO TUBULAR MEMBERS

BACKGROUND OF THE INVENTION

1. Field of the Invention

This invention relates to a cam-locking coupling assembly that couples two tubular members, more particularly to a cam-lock actuating device for use in a locking coupling assembly which is operable to safely connect and disconnect two tubular members.

2. Description of the Related Art

Referring to FIG. 1, a conventional locking coupling assembly is shown to include a cylindrical body 1 connected to a female coupling tube (not shown), a male coupling tube 2 inserted into the cylindrical body 1 and fluid-tightly engaged therewith by means of a seal ring 3, and two cam arms 10 pivotably mounted on two lugs 101 of the cylindrical body 1 by pivot pins 112, respectively. Each of the cam arms 10 has a cam surface 111 extending into the cylindrical body 1 for engaging an annular grooved surface 201 of the male coupling tube 2 when the respective cam arm 10 is at a locking position. A spring-biased lock bolt 12 is movably received in a hole formed in each of the cam arms 10 such that a locking end 121 extends through the hole to be inserted into a locking hole 103 in the cylindrical body 1 for retaining the cam arm 10 at the locking position. A pull ring 14 is attached to the lock bolt 12 such that, by pulling the pull ring 14, the locking end 121 is moved to be disengaged from the locking hole 103 so as to permit turning of the respective cam arm 10 to an unlocking position, where the cam surface 111 is disengaged from the annular grooved surface 201. Thus, the locking coupling assembly can be used to quickly connect and disconnect two tubular members, such as hoses, pipes, etc.

However, since such locking coupling assembly is generally filled with a pressurized fluid in use, once the cam arms 10 are turned to the unlocking position by an operator, the male coupling tube 12 may burst from the internal pressure in the female coupling tube, which may cause injury to the operator. Besides, the pressurized fluid may be ejected from the female coupling tube and pollute the environment.

SUMMARY OF THE INVENTION

An object of the present invention is to provide a cam-lock actuating device for use in a locking coupling assembly, which can be conveniently and safely operated to quickly connect and disconnect two tubular members.

According to this invention, the cam-lock actuating device includes an actuatable lever, an angularly positioning member, and leading and trailing releasably retaining members. The actuatable lever includes a head which is pivotally mounted on a lug unit of a female tubular coupler about a pivot axis, and which has a first forward surface region that extends angularly about the pivot axis, and an arm which is angularly displaceable among a fully locked position, where the arm is closer to a ledge of the female tubular coupler, an unlocked position, where the arm is remote from the ledge, and a partially locked position that is between the fully locked position and the unlocked position. The angularly positioning member is coupled to the head to be angularly displaceable therewith about the pivot axis, and has a second forward surface region extending angularly about the pivot axis. The leading and trailing releasably retaining members are respectively disposed to extend radially and independently from at least one of the first and second forward surface regions, and are configured such that, when the actuatable lever is displaced to the fully locked position, the leading releasably retaining member is brought into frictional engagement with a retained region of a male tubular coupler that is inserted into the female tubular coupler to thereby compress an elastomeric gasket into the compressed state, such that, when the actuatable lever is displaced to the partially locked position, the trailing releasably retaining member is brought into frictional engagement with the retained region so as to permit the elastomeric gasket to be held in a normal state, thereby relieving internal pressure in two tubular members, and such that, when the actuatable lever is displaced to the unlocked position, the trailing releasably retaining member is disengaged from the retained region to permit removal of the male tubular coupler from the female tubular coupler.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 5:
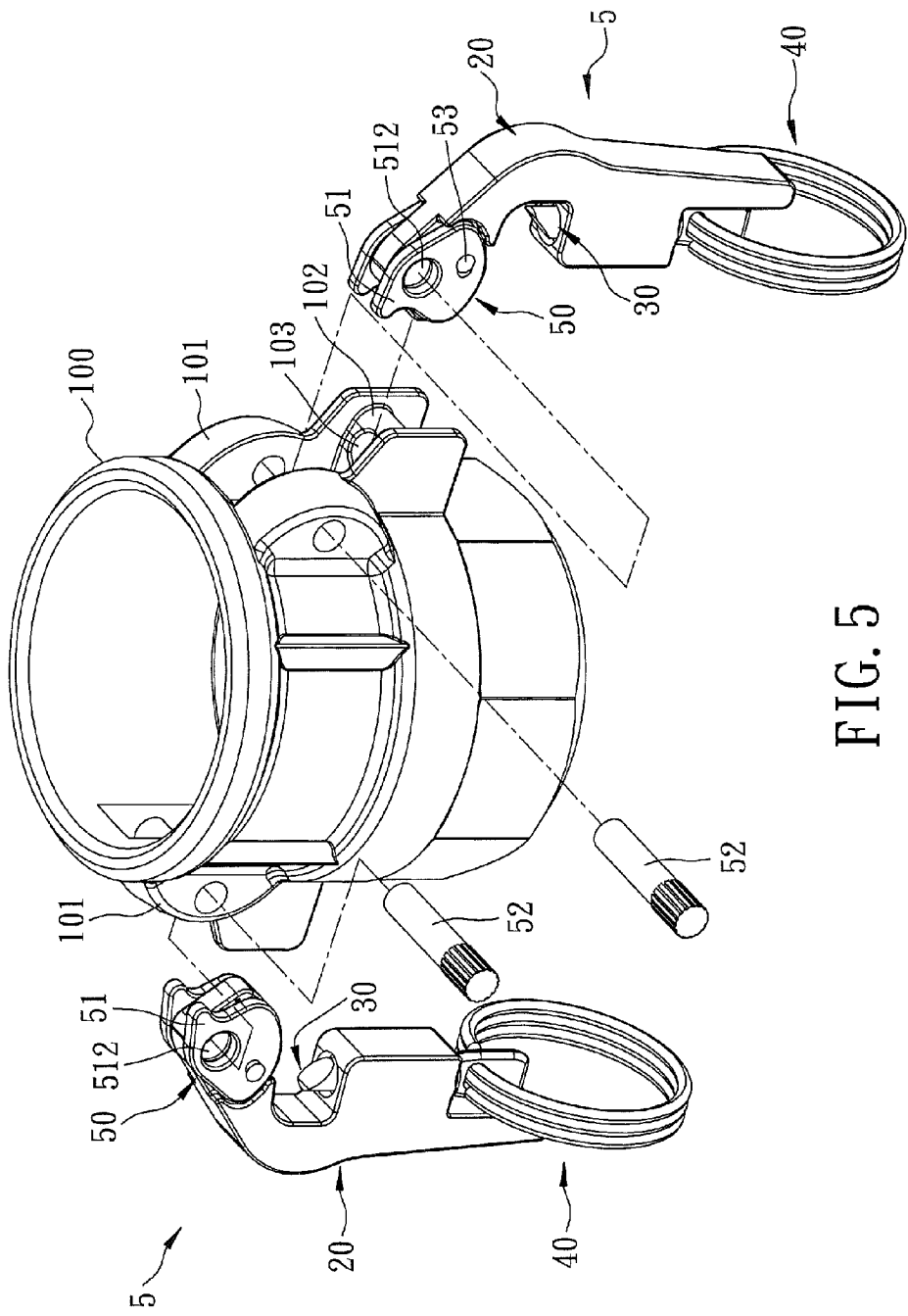
FIG. 5 is an exploded perspective view of the first embodiment mounted on a female tubular coupler.
Figure 6:
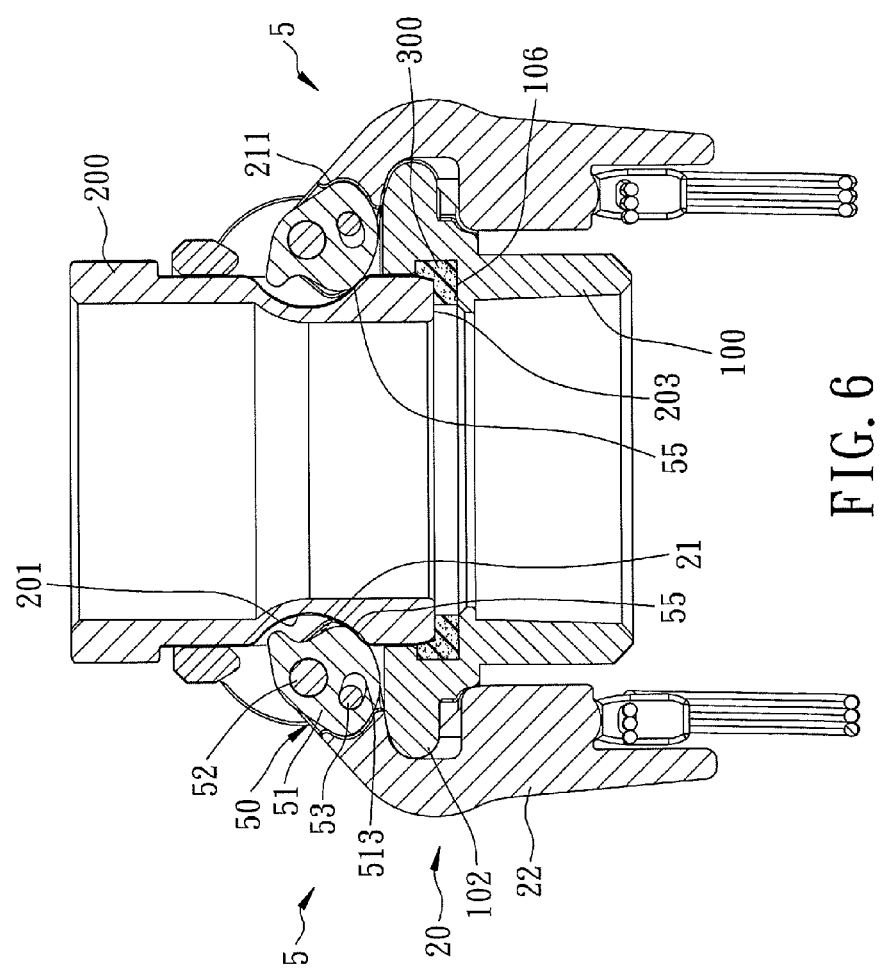
FIG. 6 is a sectional view of the first embodiment showing an actuatable lever at a fully locked position.

Referring to FIGS. 5 and 6, the first embodiment of a cam-lock actuating device 5 according to the present invention is used in a locking coupling assembly to couple two tubular members (not shown). The locking coupling assembly includes a female tubular coupler 100 which has an inner peripheral seat 106, a male tubular coupler which has a tubular marginal portion 200 that is configured to be received in the female tubular coupler 100 and that has a retained region 201, such as an annular groove 201, and a surrounding abutment edge 203, an elastomeric gasket 300 which is disposed between the surrounding abutment edge 203 and the inner peripheral seat 106 to provide a fluid-tight seal when in a compressed state, two lug units 101 which are disposed on an outer tubular surface of the female tubular coupler 100, and two ledges 102 which are disposed adjacent to the lug units 101, respectively, and each of which has a cavity 103.

Figure 1:
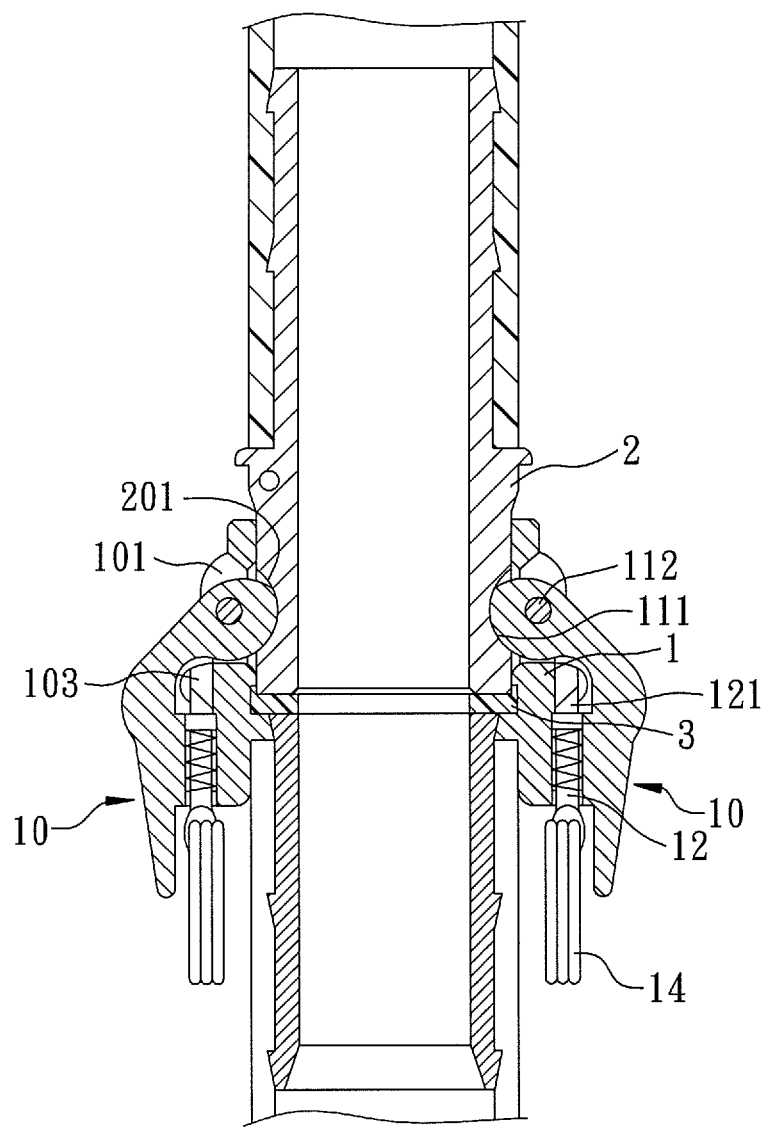
FIG. 1 is a sectional view of a conventional locking coupling assembly.
Figure 2:
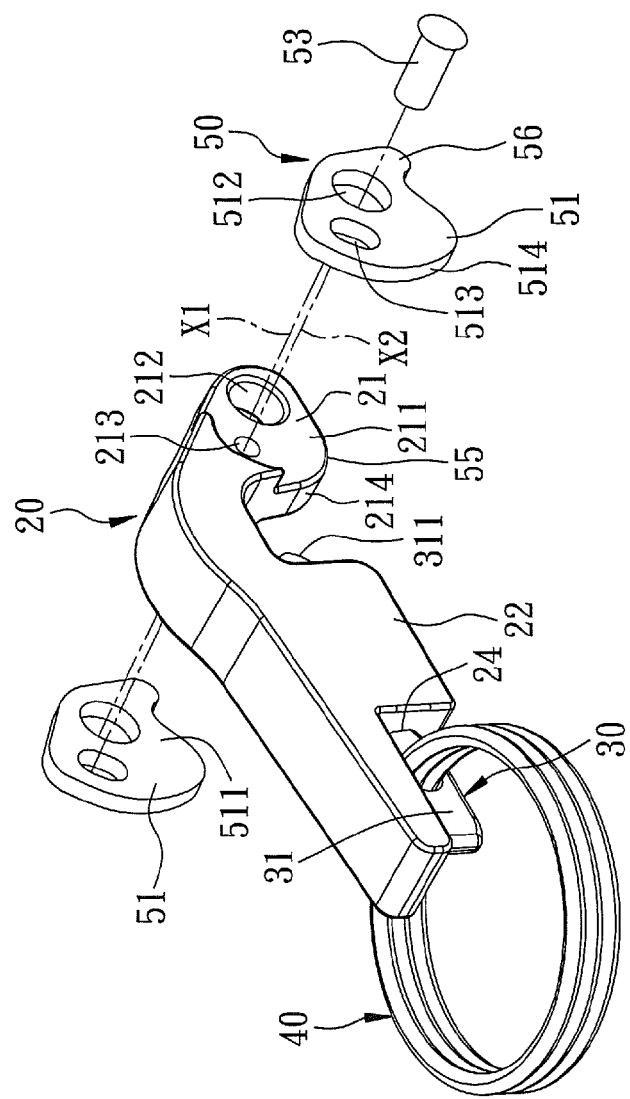
FIG. 2 is an exploded perspective view of the first embodiment of a cam-lock actuating device according to this invention.
Figure 3:
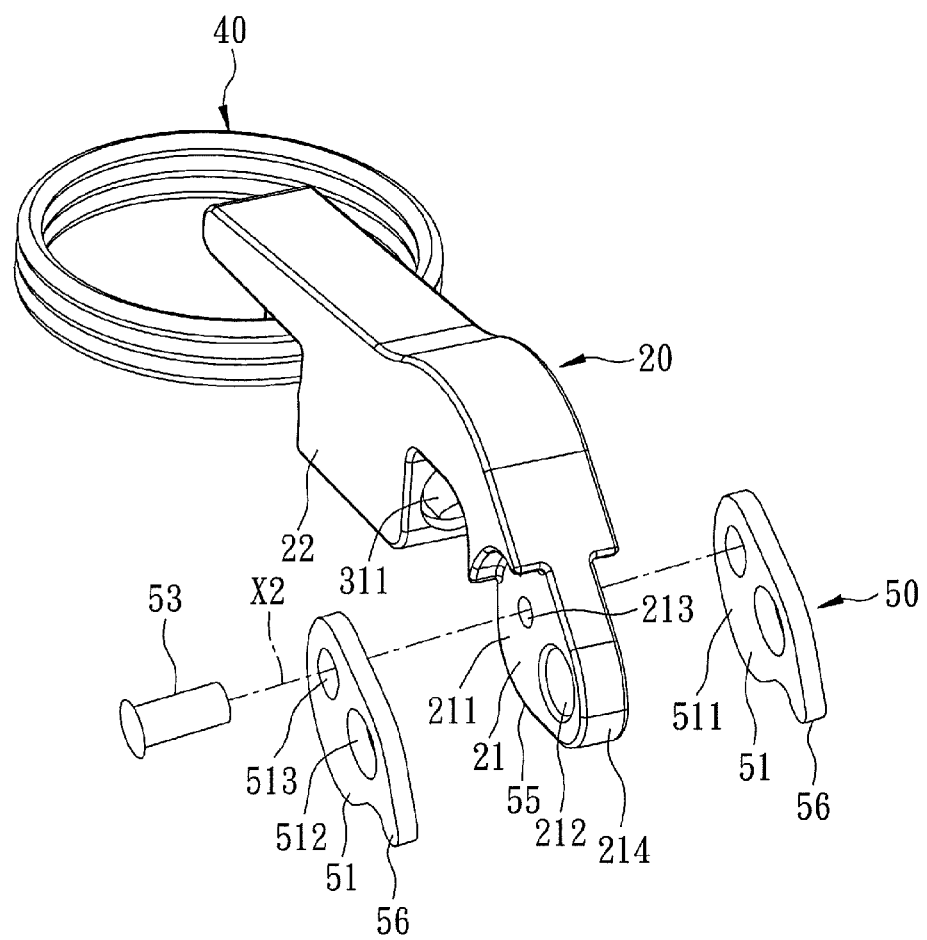
FIG. 3 is an exploded perspective view of the first embodiment taken from another angle.
Figure 4:
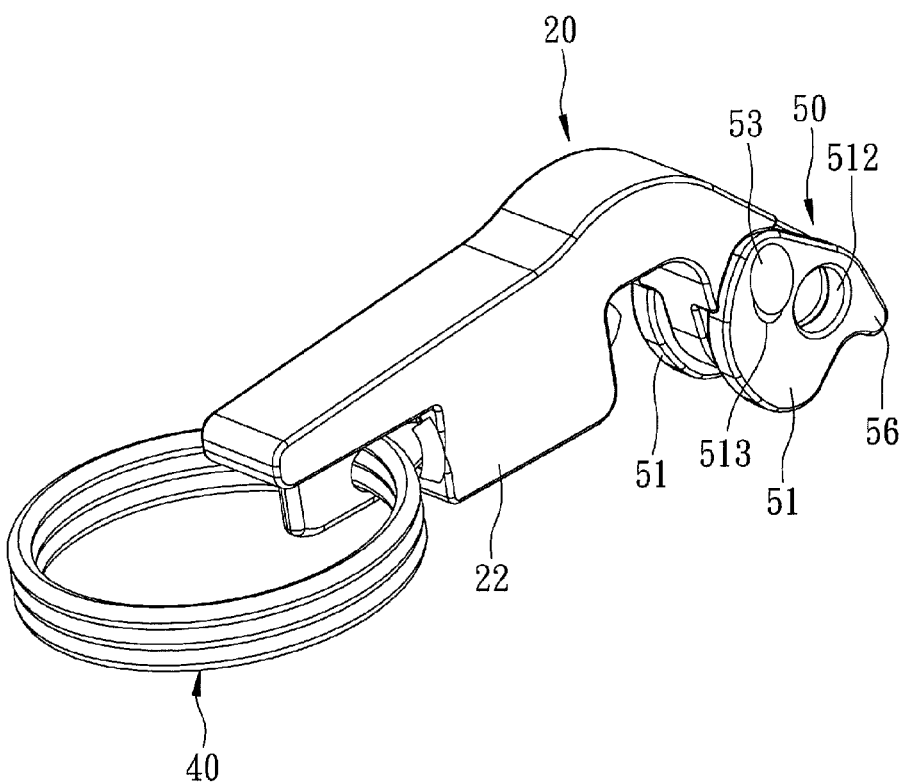
FIG. 4 is a perspective view of the first embodiment.

With reference to FIGS. 2 to 4, the cam-lock actuating device 5 of this embodiment is shown to comprise an actuatable lever 20, a spring-loaded latch unit 30, a manually operable actuator 40, and an angularly positioning unit 50.

Figure 7:
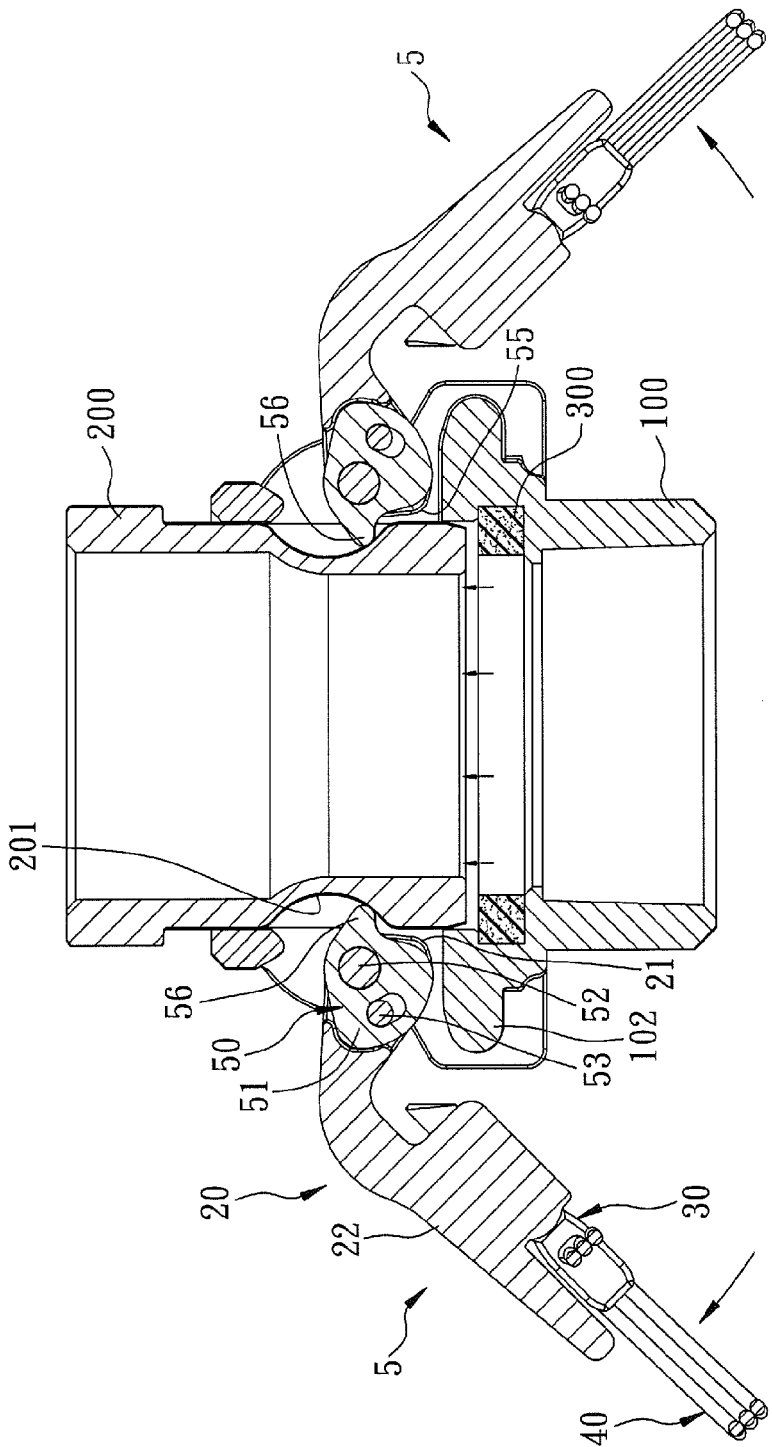
FIG. 7 is a sectional view showing the actuatable lever at a partially locked position.
Figure 8:
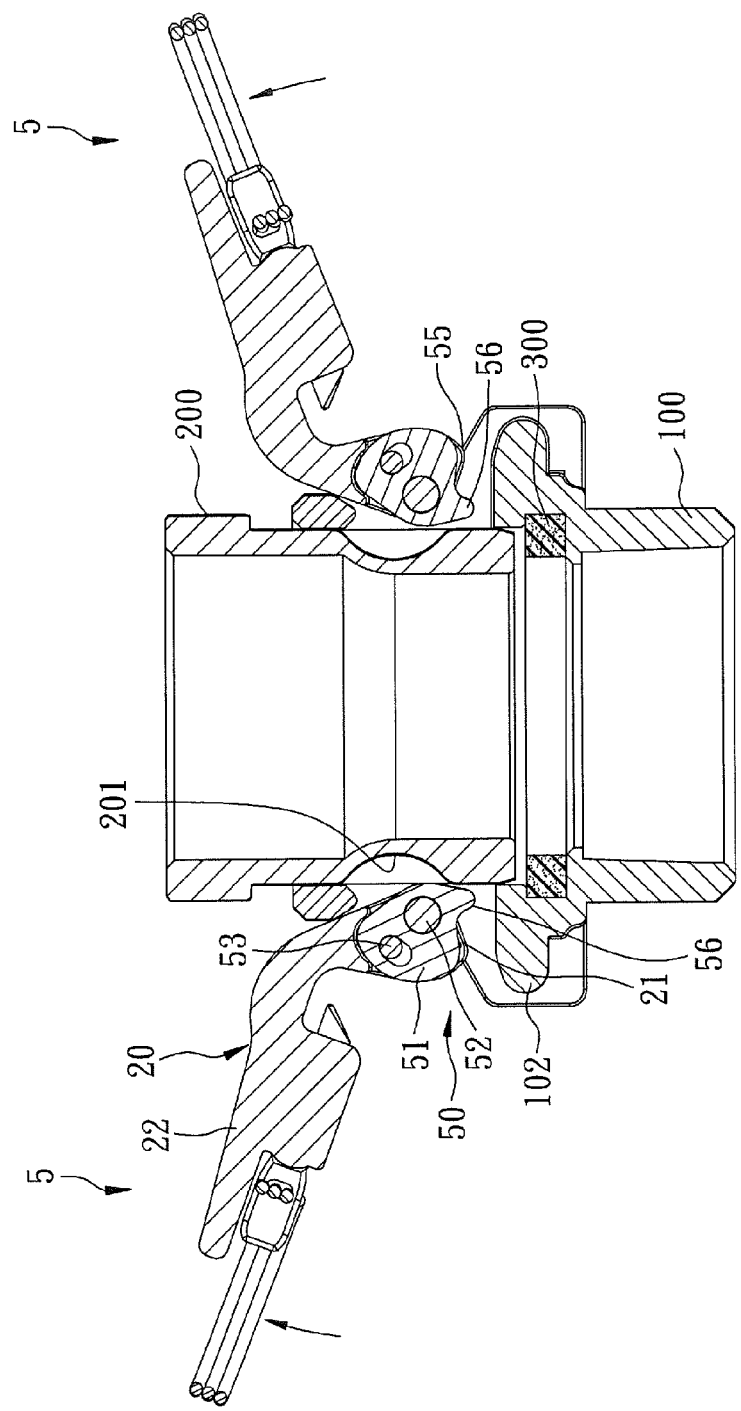
FIG. 8 is a sectional view showing the actuatable lever at an unlocked position.

The actuatable lever 20 includes a head 21 which is pivotally mounted on a respective one of the lug units 101 about a pivot axis (X1) by means of a pivot pin 52, and which has a first forward surface region 214 that extends angularly about the pivot axis (X1), and an arm 22 which is opposite to the head 21 in a lengthwise direction, and which is angularly displaceable among a fully locked position (as shown in FIG. 6), where the arm 22 is closer to the corresponding ledge 102, an unlocked position (as shown in FIG. 8), where the arm 22 is remote from the ledge 102, and a partially locked position (as shown in FIG. 7) that is between the fully locked position and the unlocked position. The head 21 has two mating surfaces 211, and two journalled holes 212, 213 extending through the mating surfaces 211 along the pivot axis (X1) and a parallel moving axis (X2), respectively. The arm 22 has a receiving bore 24 extending in the lengthwise direction.

The latch unit 30 is disposed in the receiving bore 24, and includes a spring-biased latch 31 movable along the receiving bore 24 between a latching position, where a latch end 311 of the latch 31 is extendable into the cavity 103 of the ledge 102 so as to hold the actuatable lever 20 in the fully locked position, and an unlatching position, where the latch 31 is disengaged from the cavity 103 so as to permit the arm 22 to be movable away from the fully locked position.

The manually operable actuator 40 is in the form of a pull ring 40 which is attached to the latch 31 such that, by pulling the pull ring 40, the latch 31 is moved against a biasing force of a spring (not shown) to the unlatching position.

Referring to FIGS. 2, 5 and 6, the angularly positioning unit 50 includes two plate-like angularly positioning members 51 which respectively have mating surfaces 511 joined with the mating surfaces 211 of the head 21, respectively, by the pivot pin 52 to be normal to the pivot axis (X1). The pivot pin 52 is journalled on the mating surfaces 511, 211 and fittingly extends through the journalled holes 512, 212 to be secured to the lug unit 101. Hence, the angularly positioning members 51 are angularly displaceable with the head 21 about the pivot axis (X1). Each of the angularly positioning members 51 has a second forward surface region 514 extending angularly about the pivot axis (X1). Leading and trailing releasably retaining members 55, 56 are respectively disposed to extend radially and independently from the first and second forward surface regions 214, 514. As shown in FIG. 6, when the actuatable lever 20 is displaced to the fully locked position, the leading releasably retaining members 55 are brought into frictional engagement with the retained region 201 to thereby compress the elastomeric gasket 300 into the compressed state. As shown in FIG. 7, when the actuatable lever 20 is displaced to the partially locked position, the trailing releasably retaining members 56 are brought into frictional engagement with the retained region 201 so as to permit the elastomeric gasket 300 to be held in a normal state, thereby relieving an internal pressure in the locking coupling assembly. As shown in FIG. 8, when the actuatable lever 20 is displaced to the unlocked position, the trailing releasably retaining members 56 are disengaged from the retained region 201. At this stage, the male tubular coupler can be readily removed from the female tubular coupler 100. The second forward surface regions 514 of the angularly positioning members 51 may further have a contour mating with the leading releasably retaining members 55 so as to be brought into frictional engagement with the retained region 201 in the fully locked position.

A position self-adjusting assembly is disposed between the mating surfaces 211, 511 of the head 21 and the angularly positioning member 51 to permit angular movement of the angularly positioning member 51 relative to the head 21. In this embodiment, the position self-adjusting assembly includes an elongated slot 513 which is formed in the mating surface 511 of the angularly positioning member 51, and which extends angularly about the pivot axis (X1), and a peg 53 which is disposed in the journalled hole 213 to extend from the mating surface 211 of the head 21 along the moving axis (X2) and which is engaged in and movable relative to the elongated slot 513. Therefore, the angularly positioning member 51 is slightly displaceable relative to the head 21 to be readily moved to the partially locked position for bringing the trailing releasably retaining member 56 into engagement with the retained region 201.

As illustrated, by virtue of the angularly positioning unit 50, during the angular displacement of the arm 22 from the fully locked position to the unlocked position as a result of manual operation of the pull ring 40, the trailing releasably retaining members 56 integrally formed with the angularly positioning members 51 can be held in partially locking engagement with the retained region 201 so as to guard against undesirable abrupt and complete removal of the tubular marginal portion 200 from the female tubular coupler 100 while permitting gradual relief of the internal pressure in the locking coupling assembly, thereby preventing injury to the operator.

Figure 9:
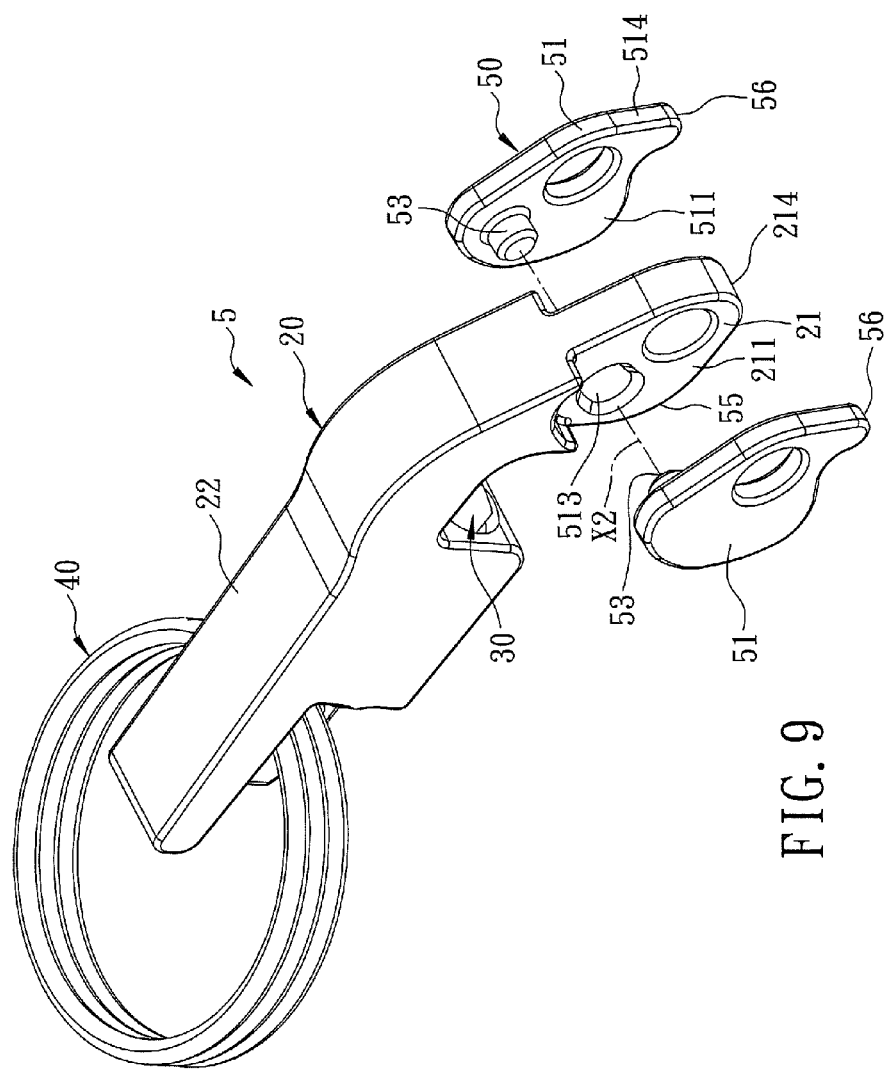
FIGS. 9 and 10 are exploded and perspective views of the second embodiment of this invention, respectively.
Figure 10:
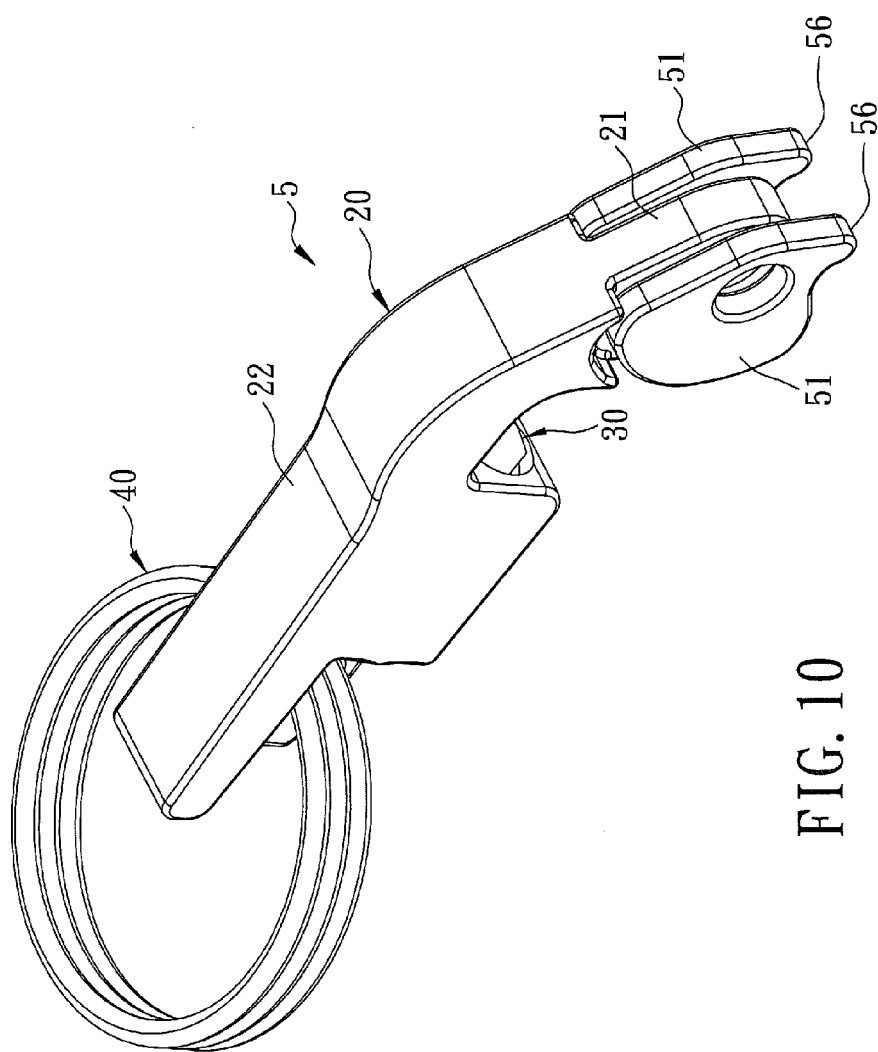

Referring to FIGS. 9 and 10, the second embodiment of the cam-lock actuating device 5 of this invention is shown to be a slight modification of the first embodiment, and differs therefrom in that the position self-adjusting assembly includes an elongated slot 513 formed in the head 21, and two pegs 53 integrally formed with the angularly positioning members 51 to be movably engaged in the elongated slot 513.

Figure 11:
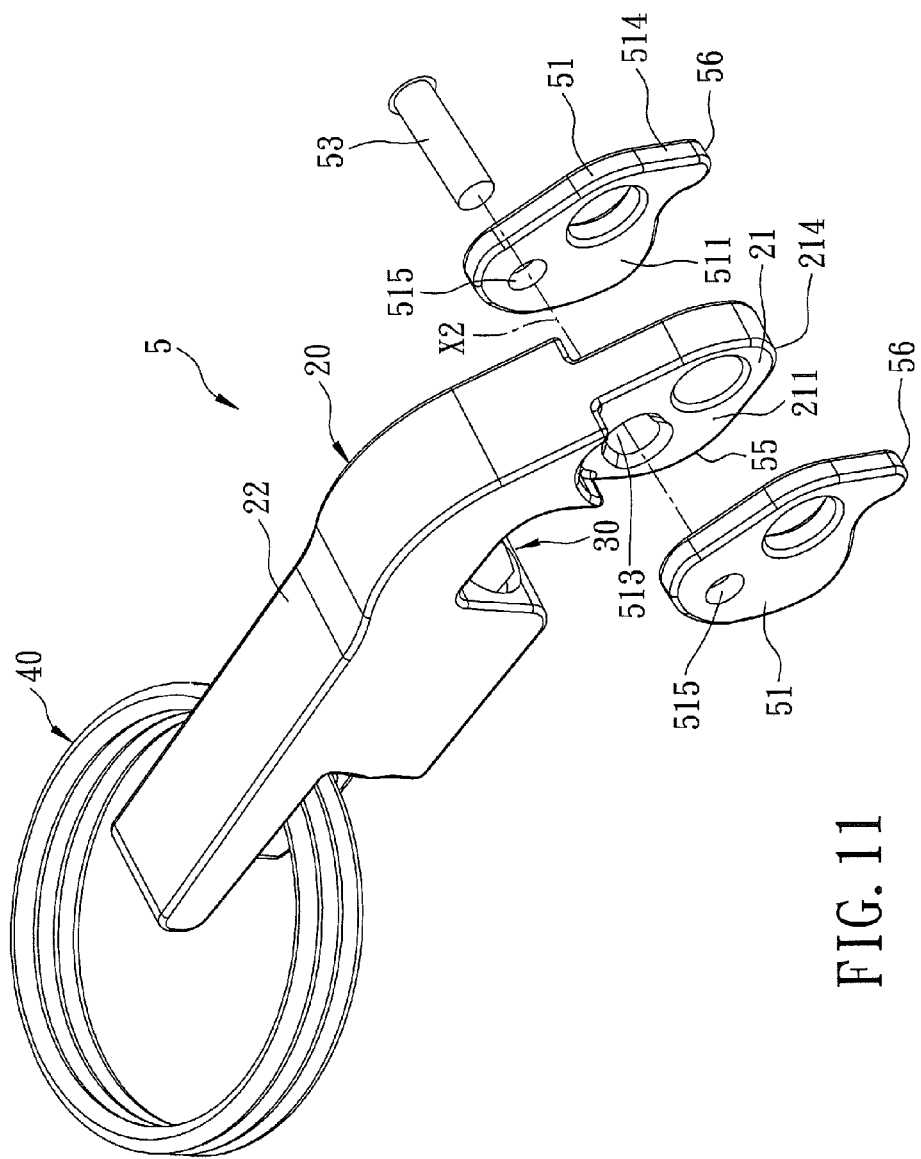
FIGS. 11 to 15 are exploded perspective views of the third to seventh embodiments of this invention, respectively.

Alternatively, referring to FIG. 11, in the third embodiment, the position self-adjusting assembly includes an elongated slot 513 formed in the head 21, two journalled holes 515 respectively formed in the angularly positioning members 51 along the moving axis (X2), and a peg 53 extending through the elongated slot 513 to be journalled in the journalled holes 515.

Figure 12:
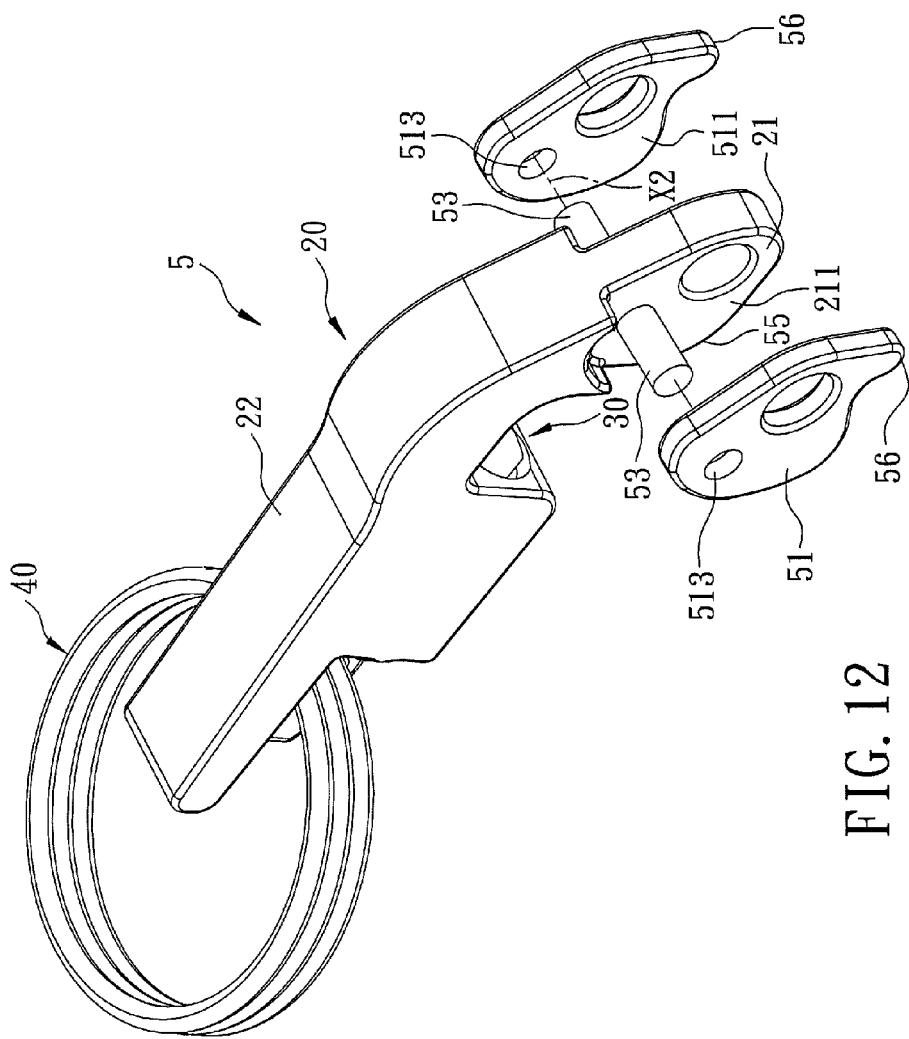

Referring to FIG. 12, in the fourth embodiment, the position self-adjusting assembly includes two elongated slots 513 respectively formed in the angularly positioning members 51, and two pegs 53 integrally formed with the head 21 to be movably engaged in the elongated slots 513, respectively.

Figure 13:
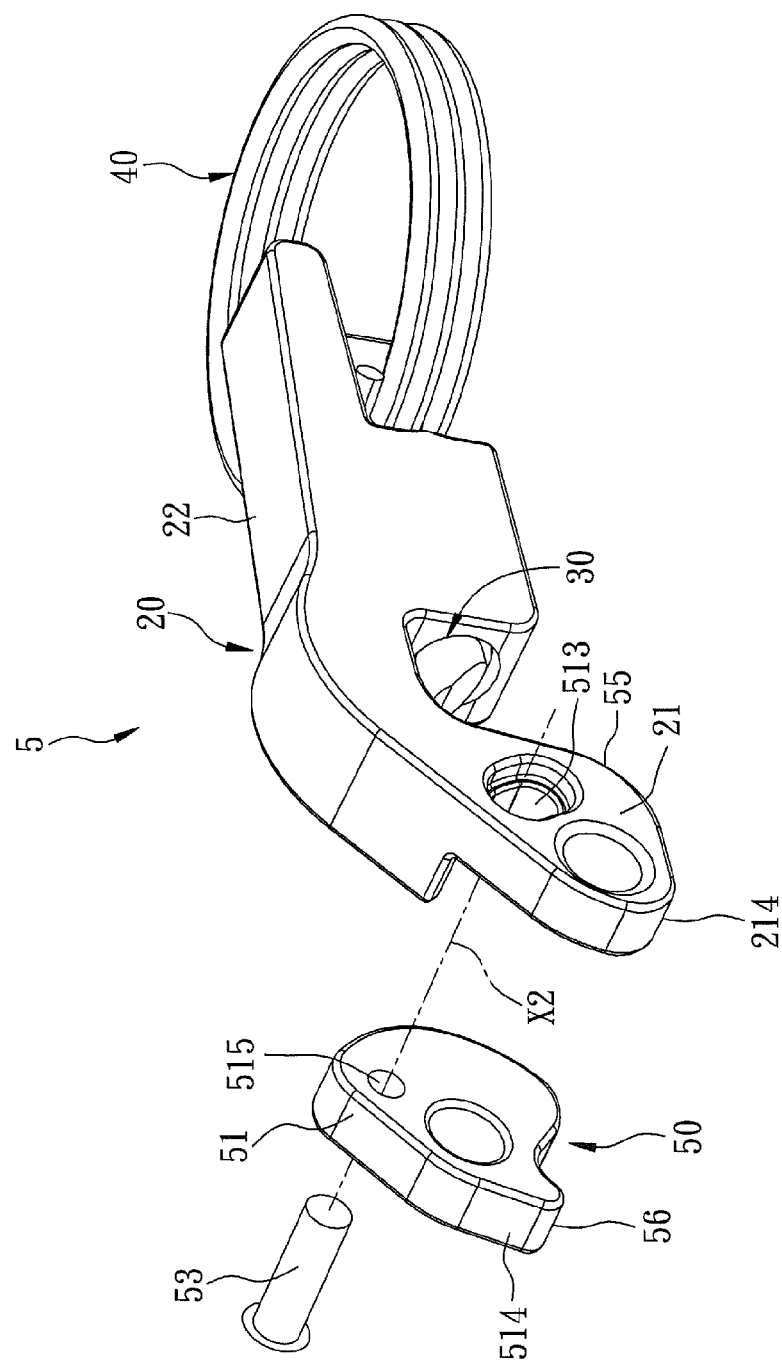

Referring to FIG. 13, in the fifth embodiment, the angularly positioning unit 50 includes an angularly positioning member 51 and a position self-adjusting assembly which includes an elongated slot 513 formed in the head 21, a journalled hole 515 formed in the angularly positioning member 51, and a peg 53 extending through the elongated slot 513 to be journalled in the journalled hole 515.

Figure 14:
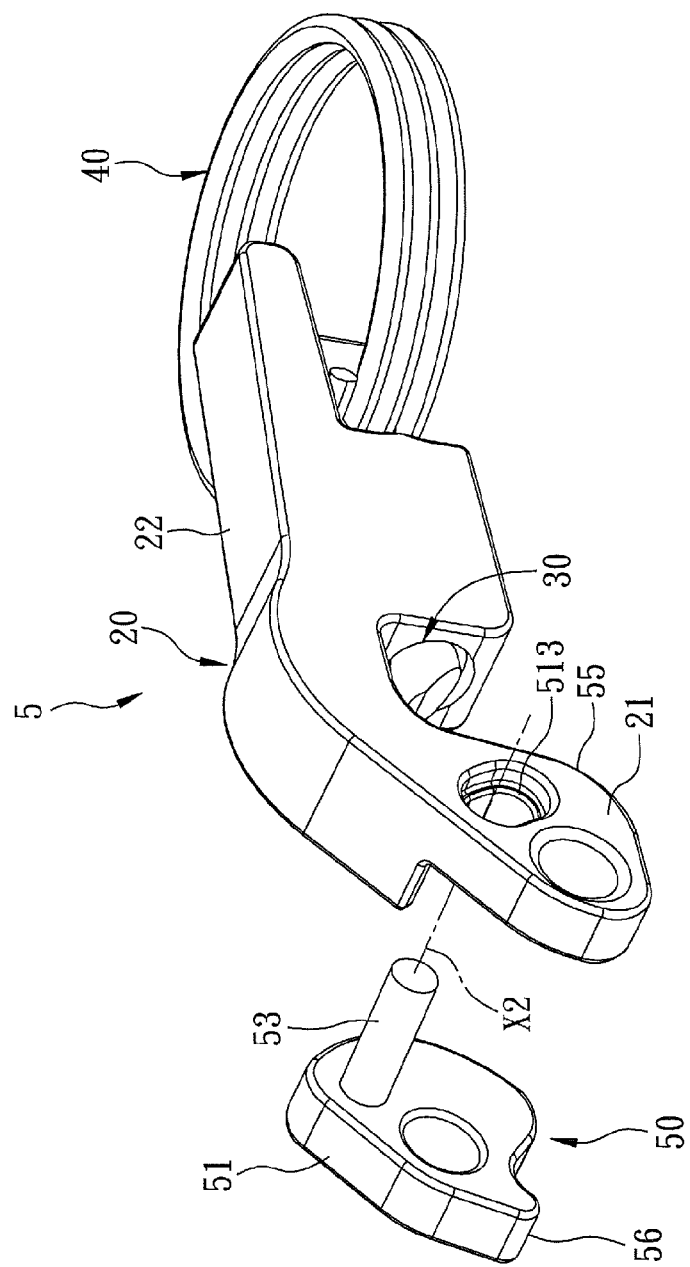

Referring to FIG. 14, in the sixth embodiment, the peg 53 may be integrally formed with the angularly positioning member 51.

Figure 15:
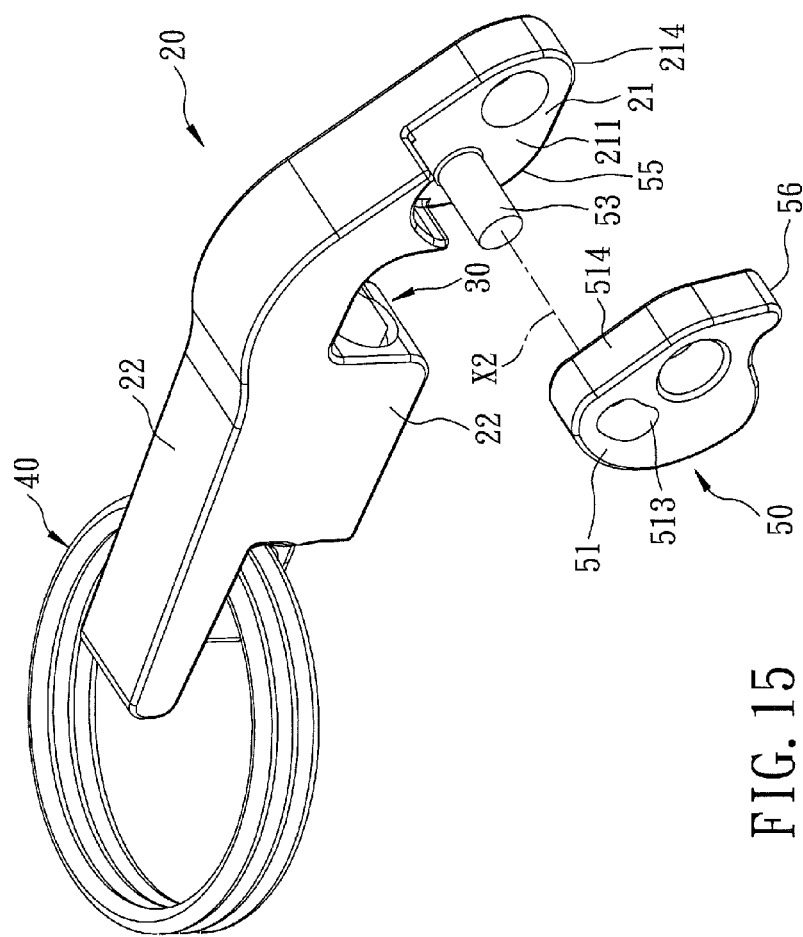

Referring to FIG. 15, in the seventh embodiment, the elongated slot 513 is formed in the angularly positioning member 51, and the peg 53 is integrally formed with the head 21.

Figure 16:
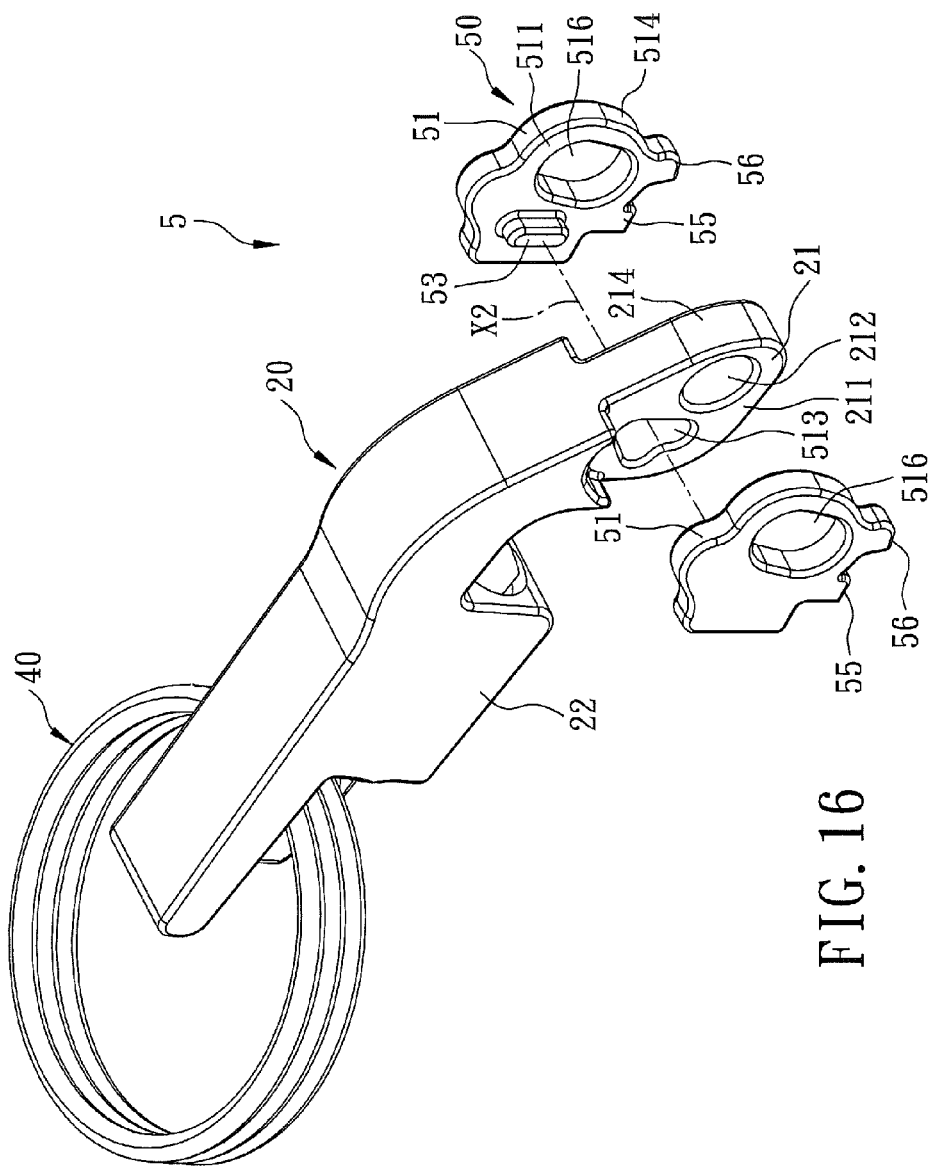
FIGS. 16 and 17 are exploded and perspective view of the eighth embodiment of this invention.
Figure 17:
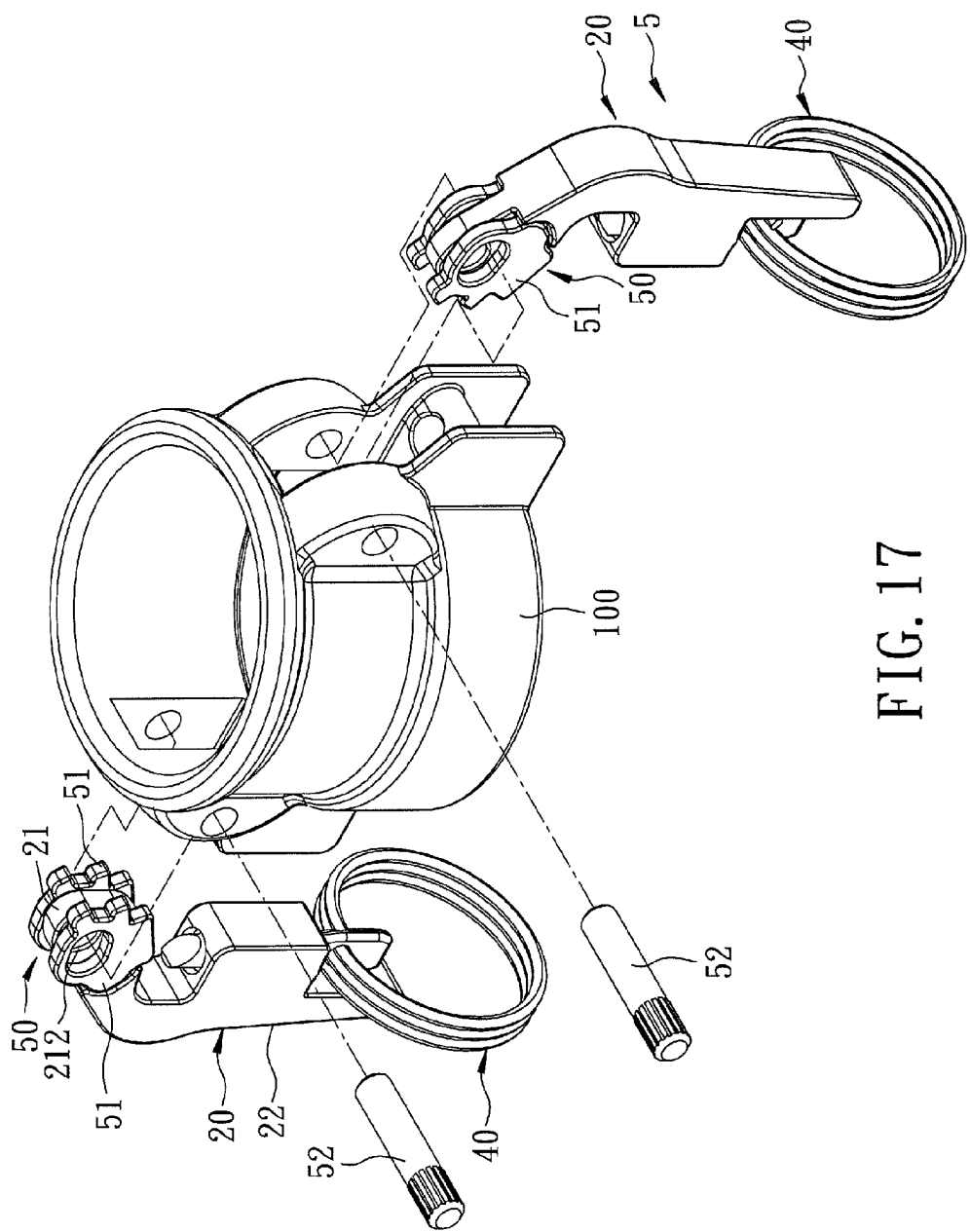
Figure 18:
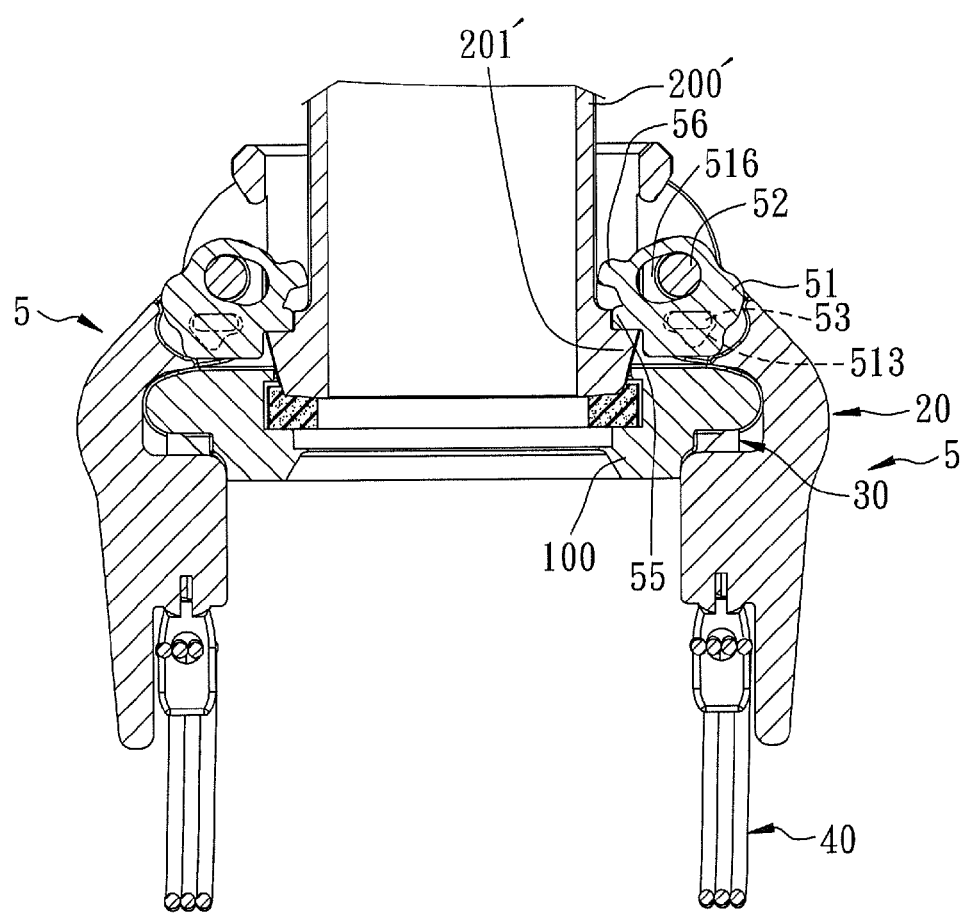
FIG. 18 is a sectional view of the eighth embodiment showing an actuatable lever at a fully locked position.

Referring to FIGS. 16 to 18, the eighth embodiment of the cam-lock actuating device 5 of this invention is slightly modified and engageable with another tubular marginal portion 200' of a male tubular coupler which has the annular retained region 201' in the form of a shoulder abutment 201'. In this embodiment, the leading and trailing releasably retaining members 55, 56 are formed to extend radially from the second forward surface region 514 of each of the angularly positioning members 51 and are angularly displaced from each other. Each of the mating surfaces 511 of the angularly positioning members 51 has an elongated hole 516 such that the pivot pin 52 extends through the elongated hole 516 to be journalled on the journalled hole 212 so as to permit the movement of the angularly positioning members 51 relative to the head 21. Moreover, the position self-adjusting assembly includes an elongated slot 513 formed in the head 21 with a triangular shape, and a peg 53 in the form of an elongated block integrally formed with the angularly positioning member 51 to be movably engaged in the elongated slot 513 so as to permit slight movement of the angularly positioning member 51 relative to the head 21.

Figure 19:
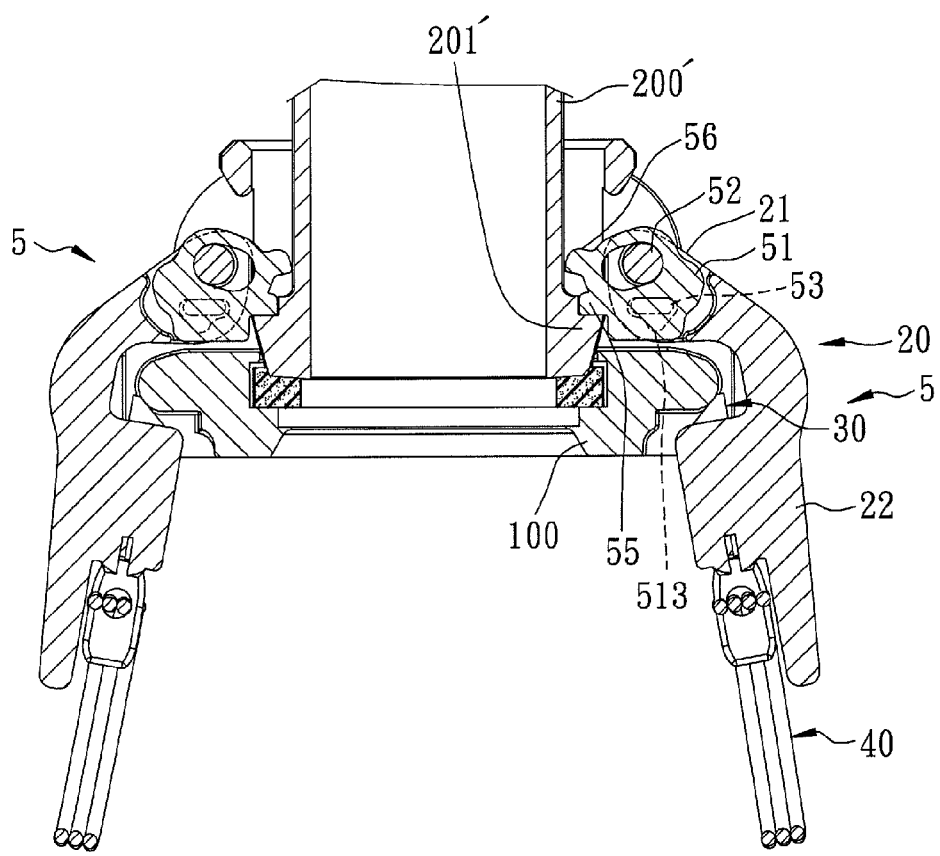
FIGS. 19 to 22 are respectively sectional views showing the actuatable lever is operated stagewise from the fully locked position to an unlocked position.
Figure 20:
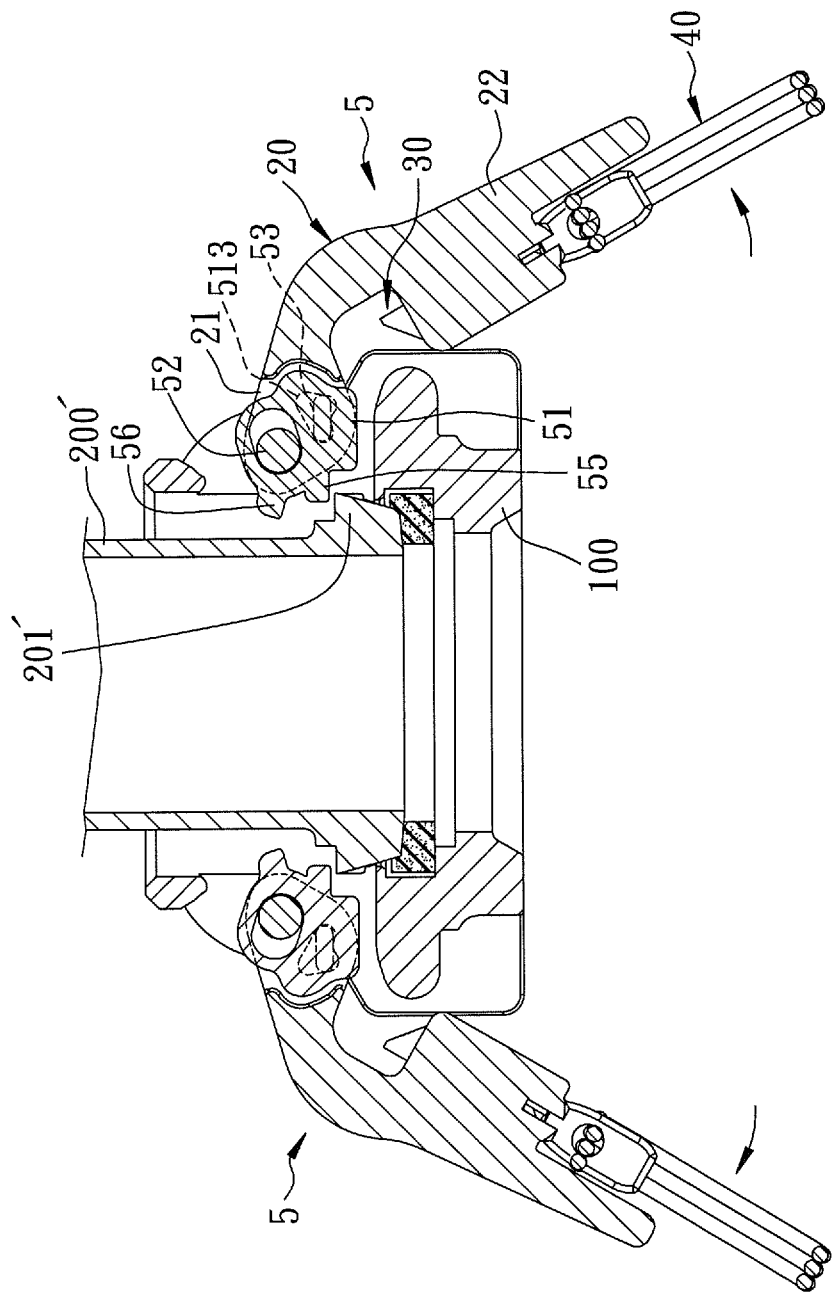
Figure 21:
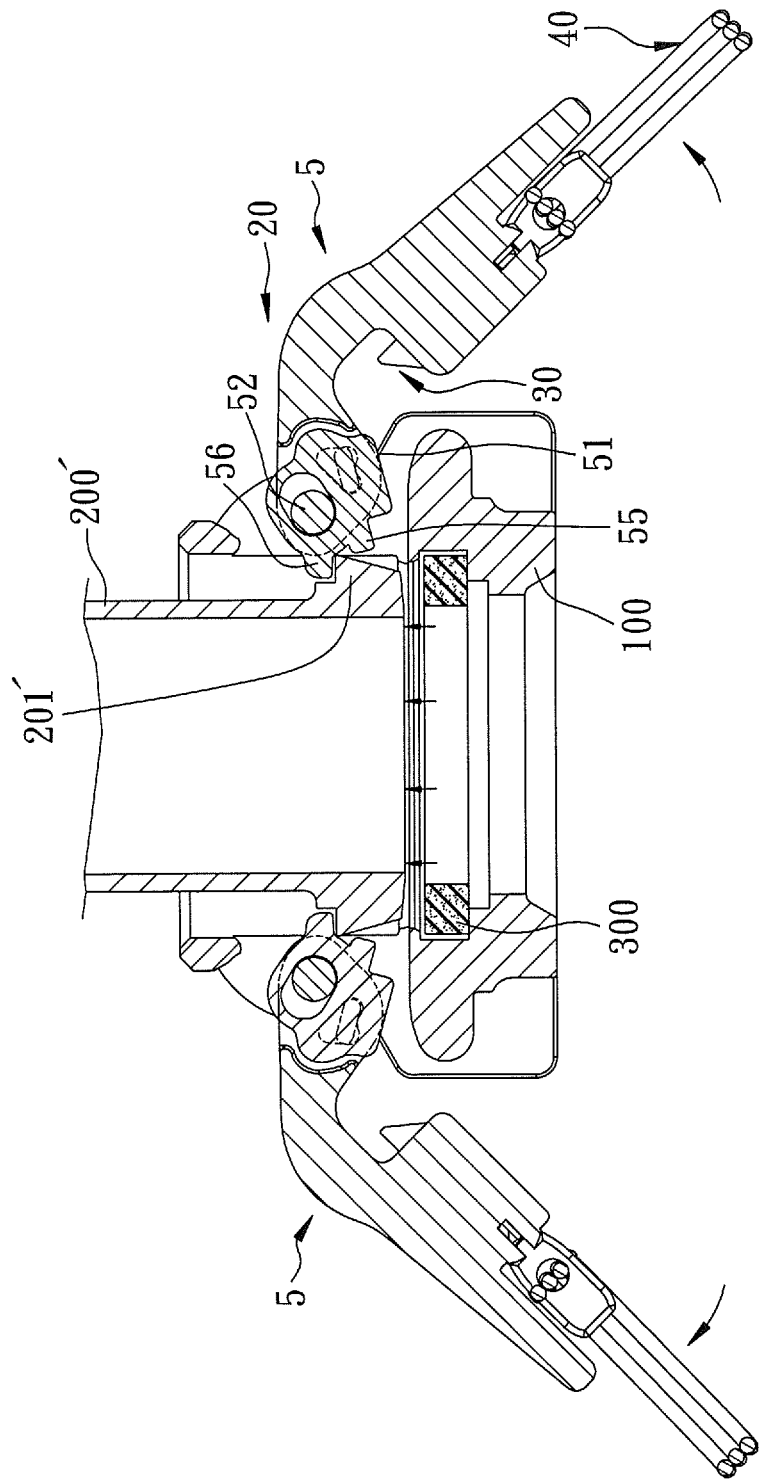
Figure 22:
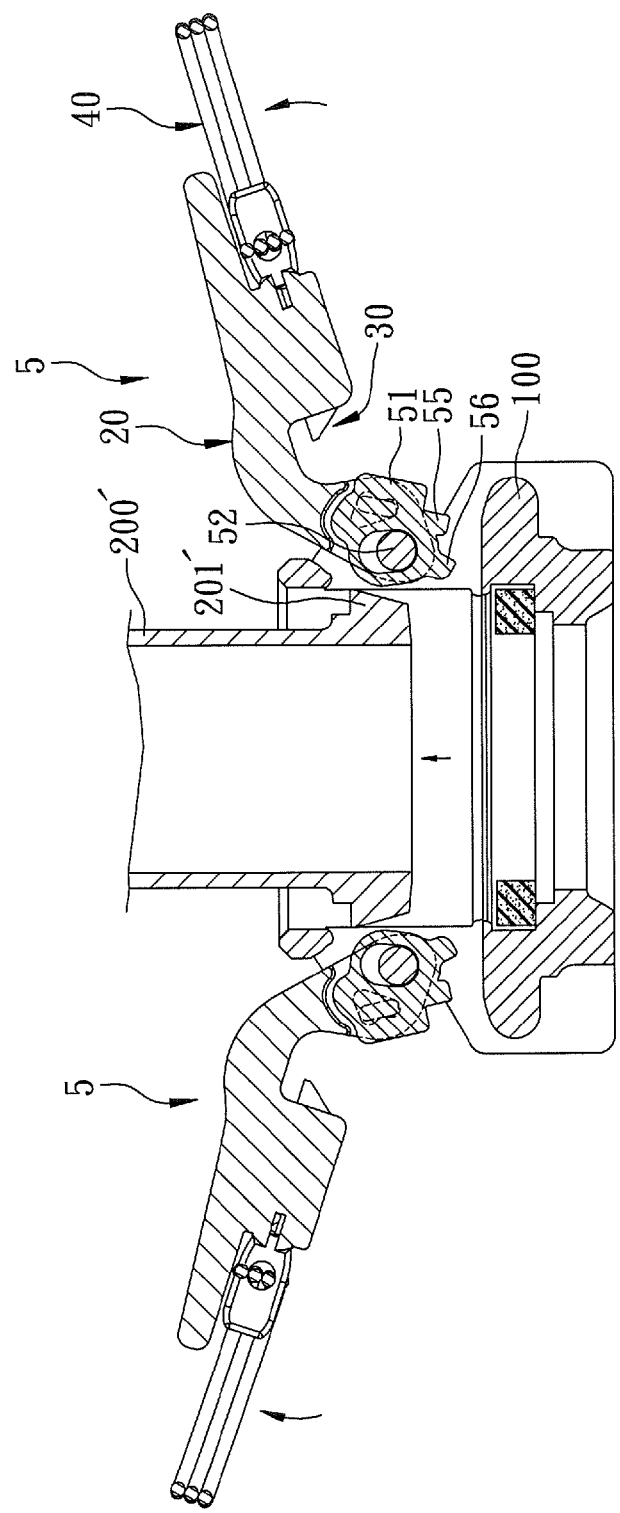

When it is desired to unlock the cam-lock actuating device 5, the pull ring 40 is pulled to the unlatched position, as shown in FIGS. 19 and 20, and the actuatable lever 20 is turned to the partially locked position, as shown in FIG. 21, where the trailing releasably retaining member 56 is engaged with the shoulder abutment 201' to prevent removal of the tubular marginal portion 200' from the female tubular coupler 100 and to permit the elastomeric gasket 300 to be moved to the normal state in which the internal pressure in the locking coupling assembly can be relieved. Further turning of the actuatable lever 20 to the unlocked position can result in disengagement of the trailing releasably retaining member 56 from the shoulder abutment 201' so as to permit removal of the tubular marginal portion 200' from the female tubular coupler 100, as shown in FIG. 22.

Figure 23:
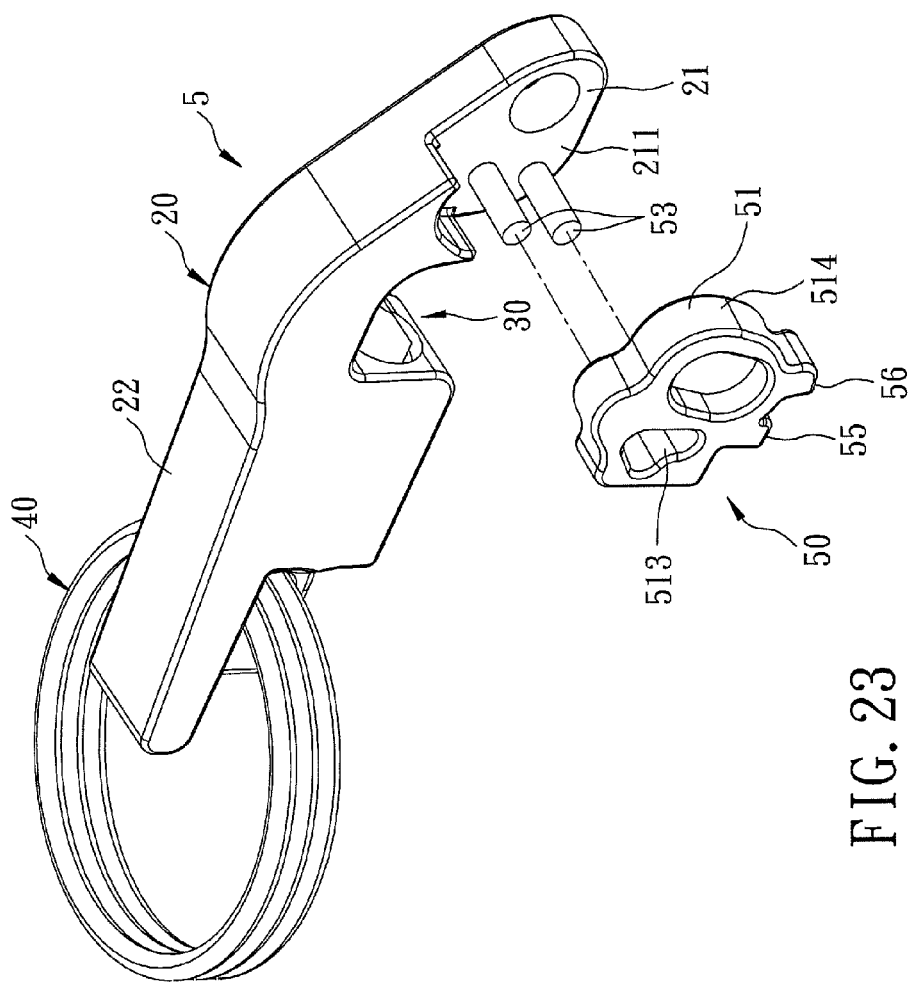
FIGS. 23 to 28 are exploded perspective views of the ninth to fourteenth embodiments of this invention, respectively.

Referring to FIG. 23, the ninth embodiment of the cam-lock actuating device 5 of this invention is shown to be a slight modification of the eighth embodiment and differs therefrom in that the angularly positioning unit 50 includes an angularly positioning member 51 and a position self-adjusting assembly which includes an elongated slot 513 formed in the angularly positioning member 51, and two parallel pegs 53 in the form of parallel stems integrally formed with the head 21 to be movably engaged in the elongated slot 513.

Figure 24:
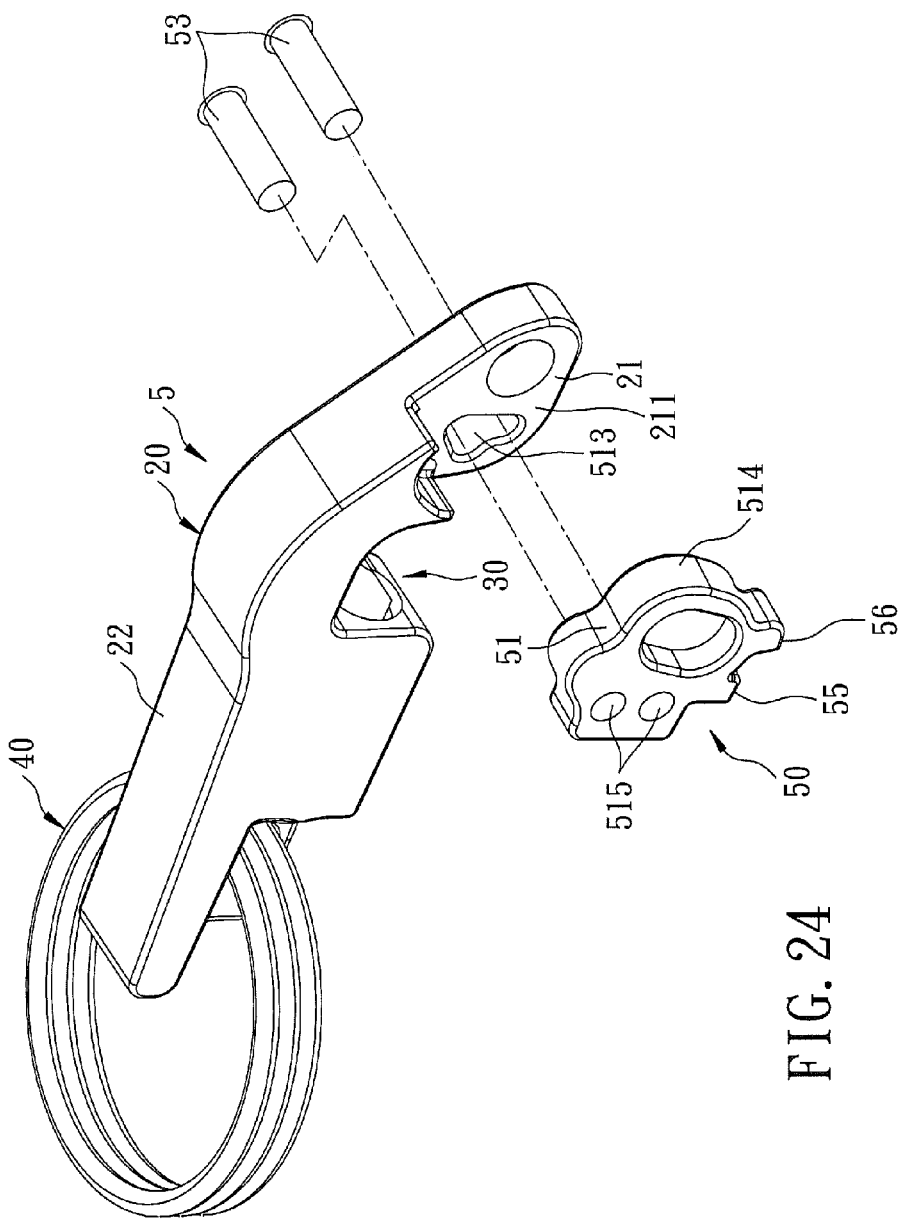

Alternatively, referring to FIG. 24, in the tenth embodiment, the position self-adjusting assembly includes an elongated slot 513 formed in the head 21, two journalled holes 515 respectively formed in the angularly positioning member 51, and two pegs 53 in the form of elongated blocks extending through the elongated slot 513 to be journalled in the journalled holes 515, respectively.

Figure 25:
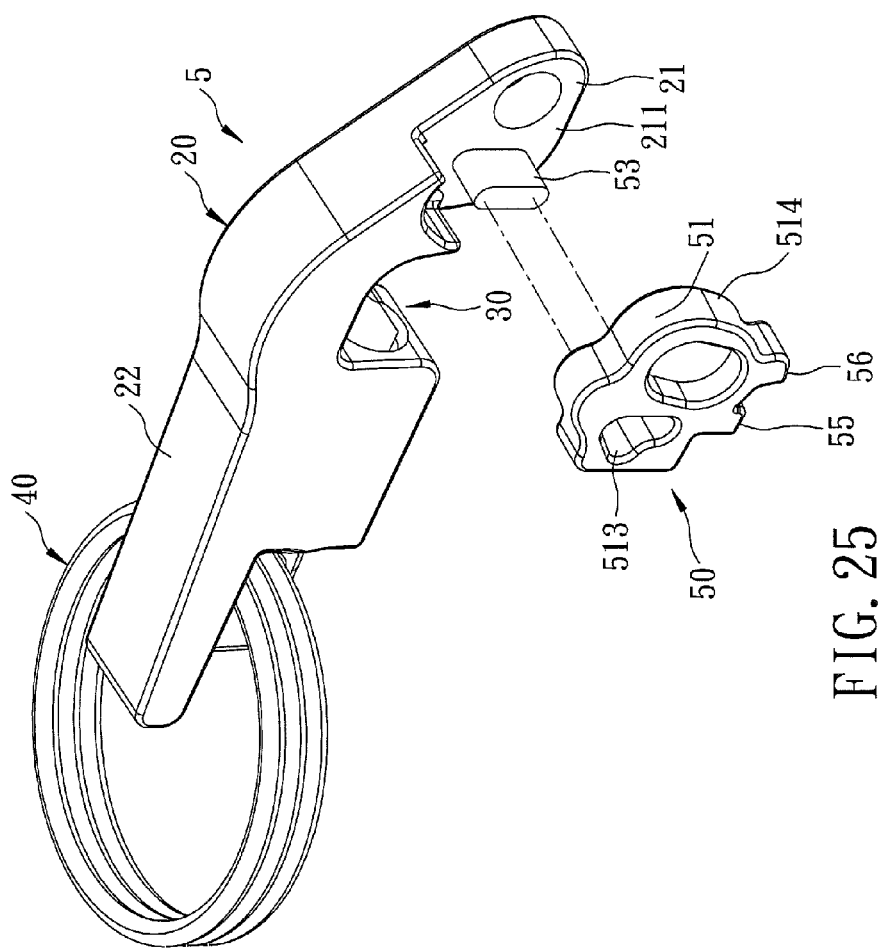

Referring to FIG. 25, in the eleventh embodiment, the position self-adjusting assembly includes an elongated slot 513 formed in the angularly positioning member 51, and a peg 53 integrally formed with the head 21 to be movably engaged in the elongated slot 513.

Figure 26:
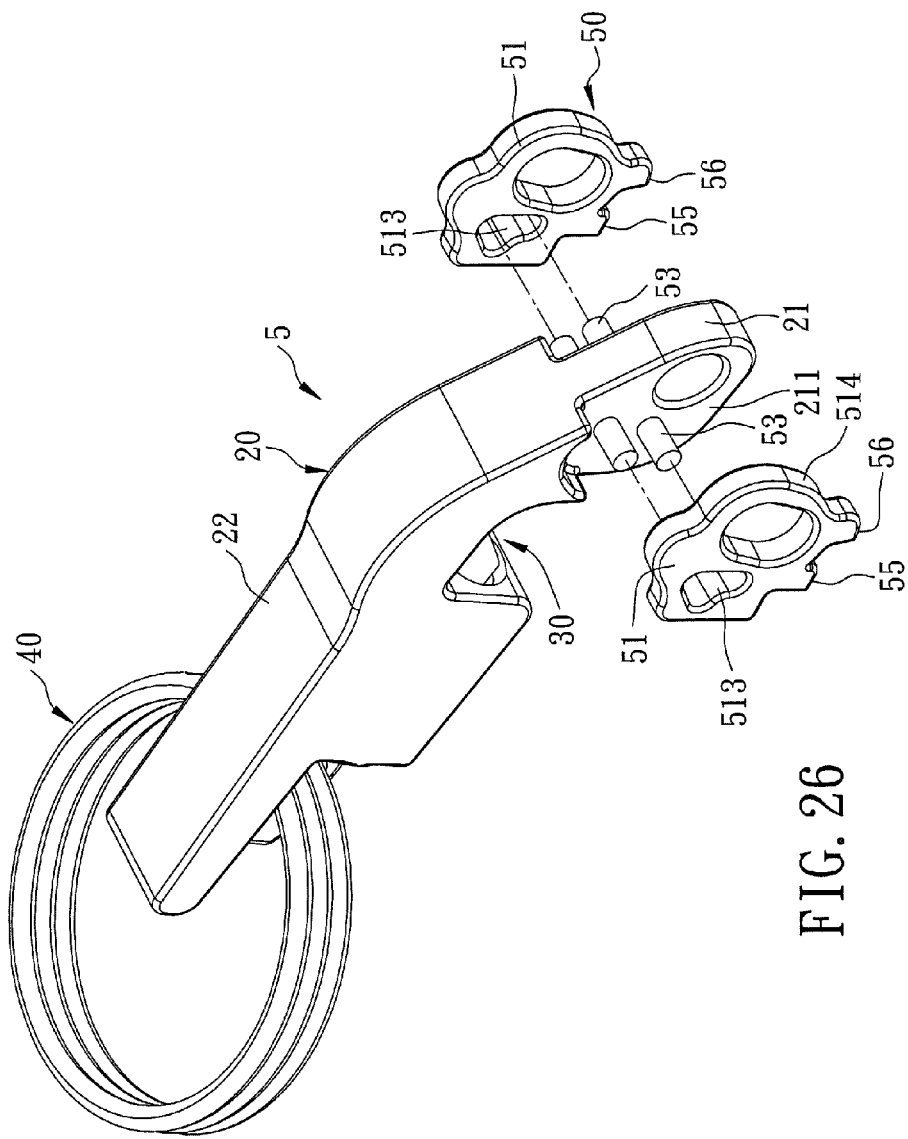

Referring to FIG. 26, in the twelfth embodiment, the angularly positioning unit 50 includes two angularly positioning members 51 and two position self-adjusting assembly. Each position self-adjusting assembly includes an elongated slot 513 formed in the corresponding angularly positioning member 51, and two pegs 53 in the form of two parallel stems integrally formed with the head 21 and extending from the corresponding mating surface 211 to be movably engaged in the elongated slot 513.

Figure 27:
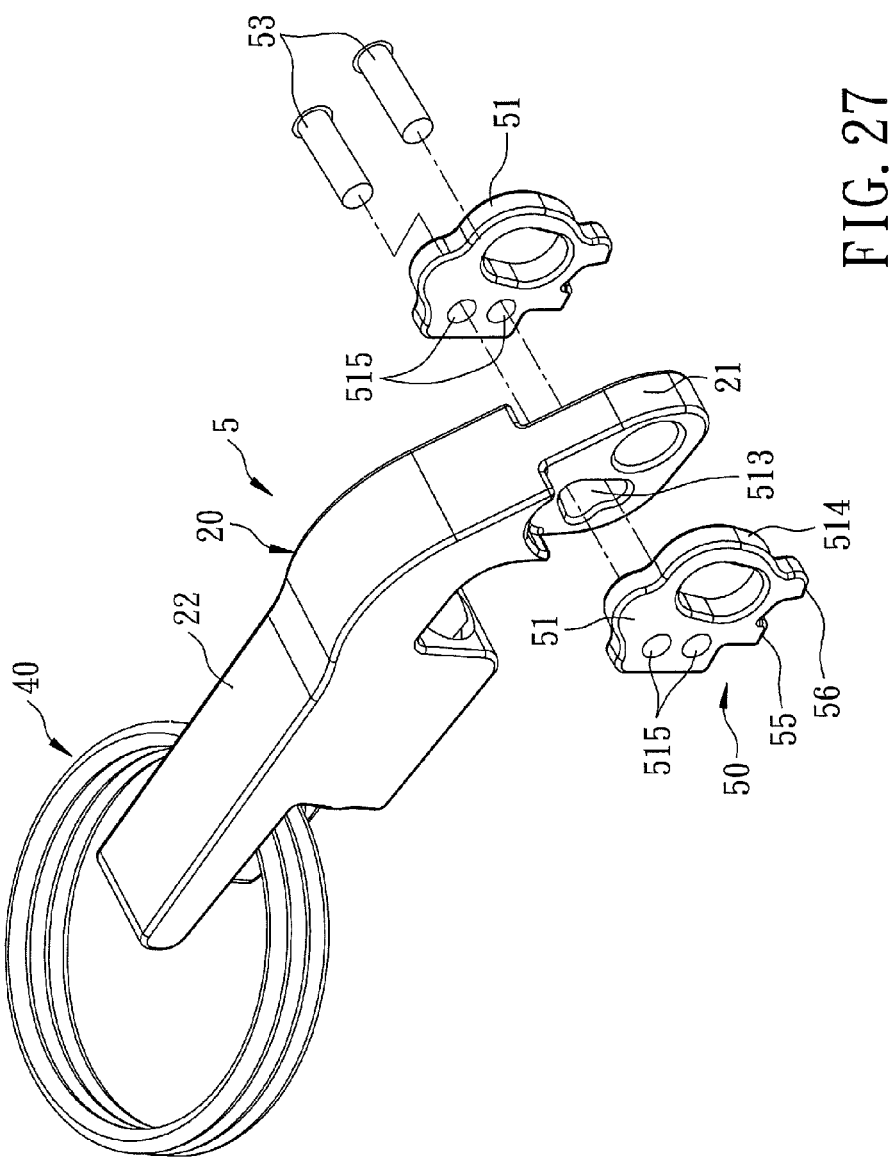

Referring to FIG. 27, in the thirteenth embodiment, the position self-adjusting assembly includes an elongated slot 513 formed in the head 21, two journalled holes 515 formed in the corresponding angularly positioning member 51, and two pegs 53 in the form of two parallel pins extending through the elongated slot 513 to be journalled in the journalled holes 515 of the angularly positioning members 51.

Figure 28:
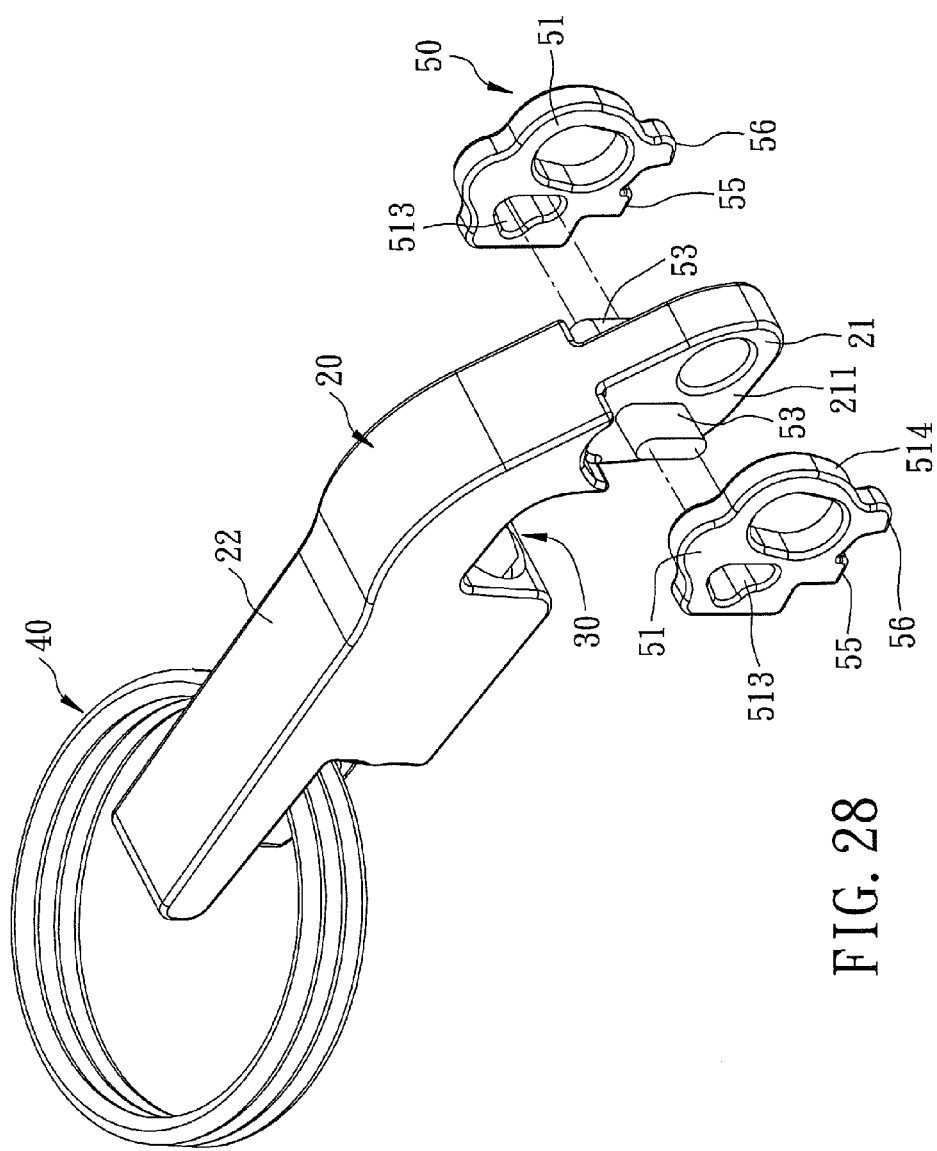
Figure 29:
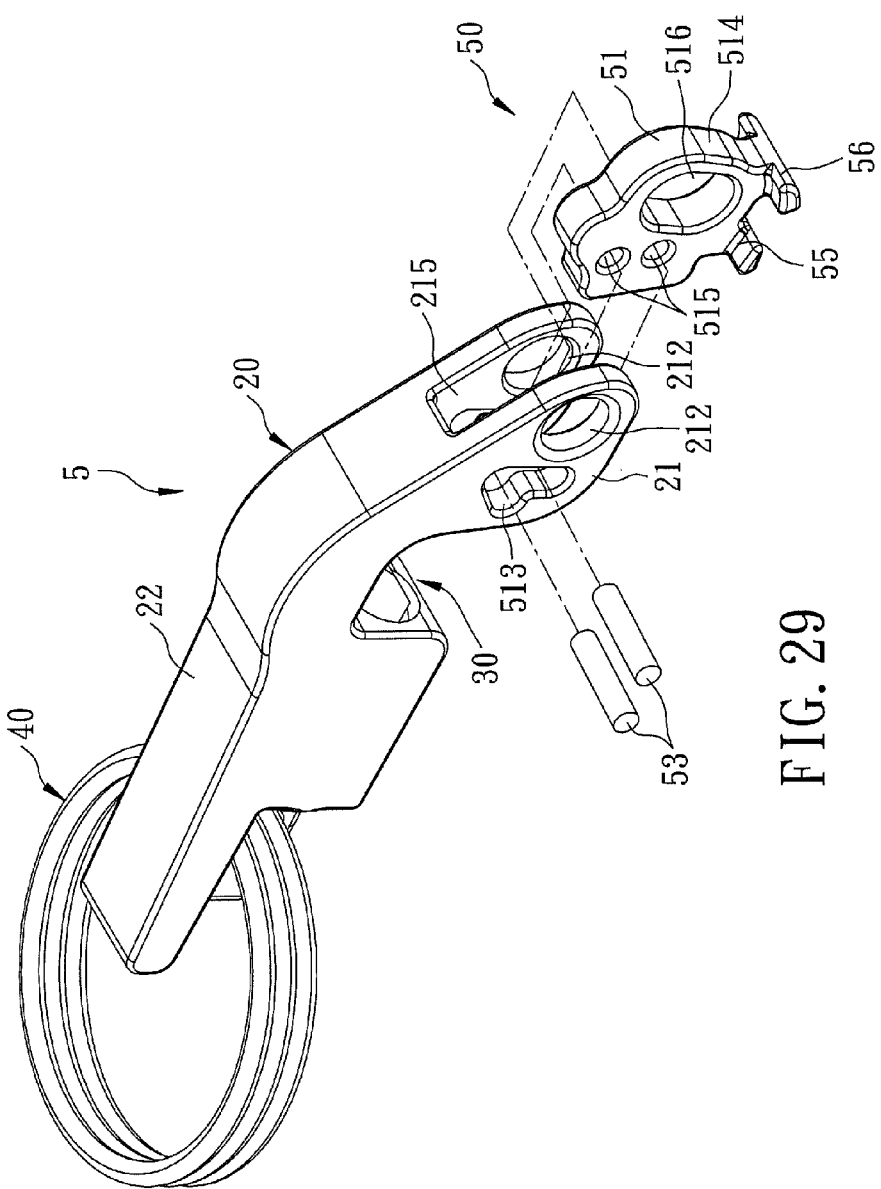
FIGS. 29 and 30 are exploded and perspective views of the fifteenth embodiment of this invention, respectively.
Figure 30:
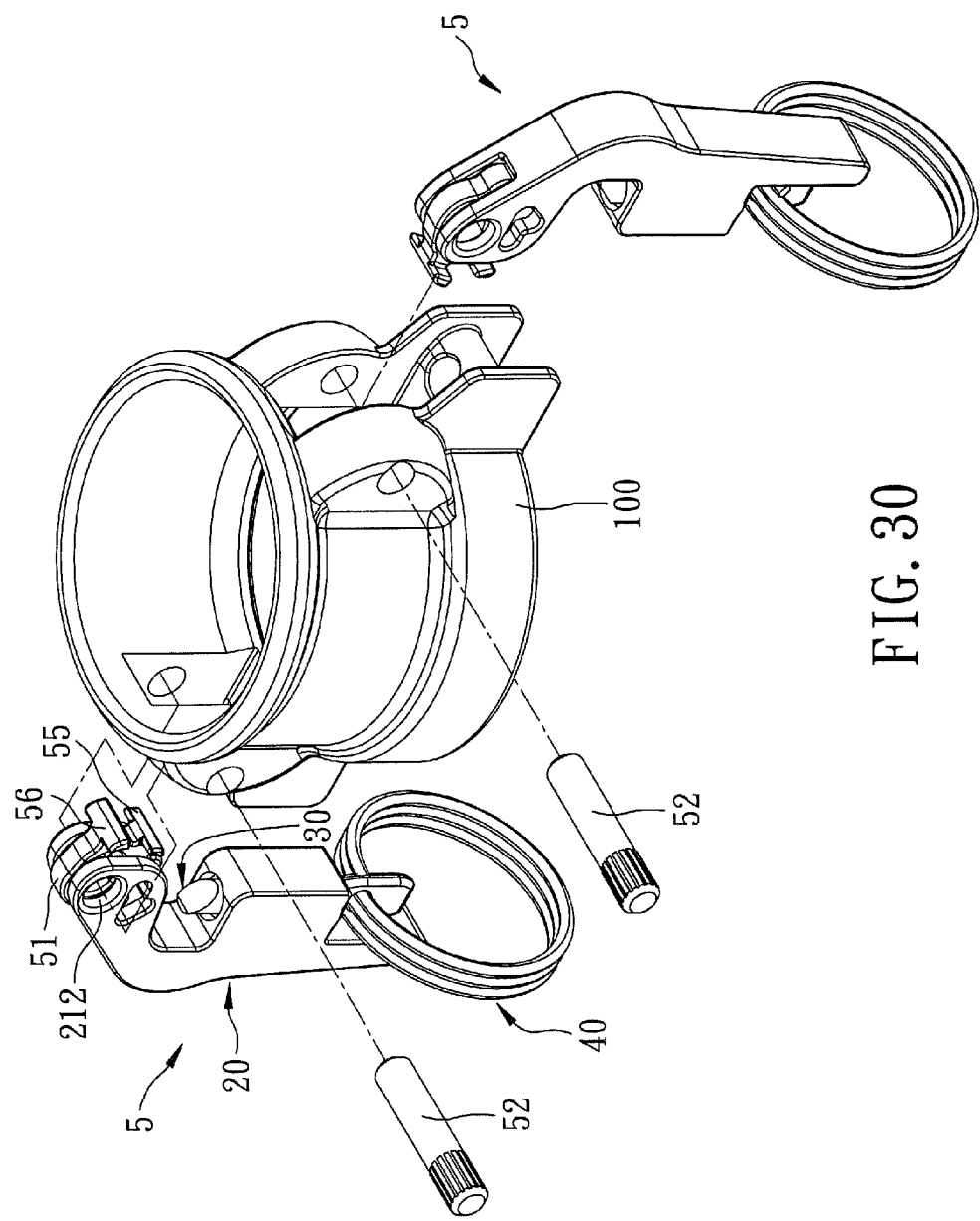
Figure 31:
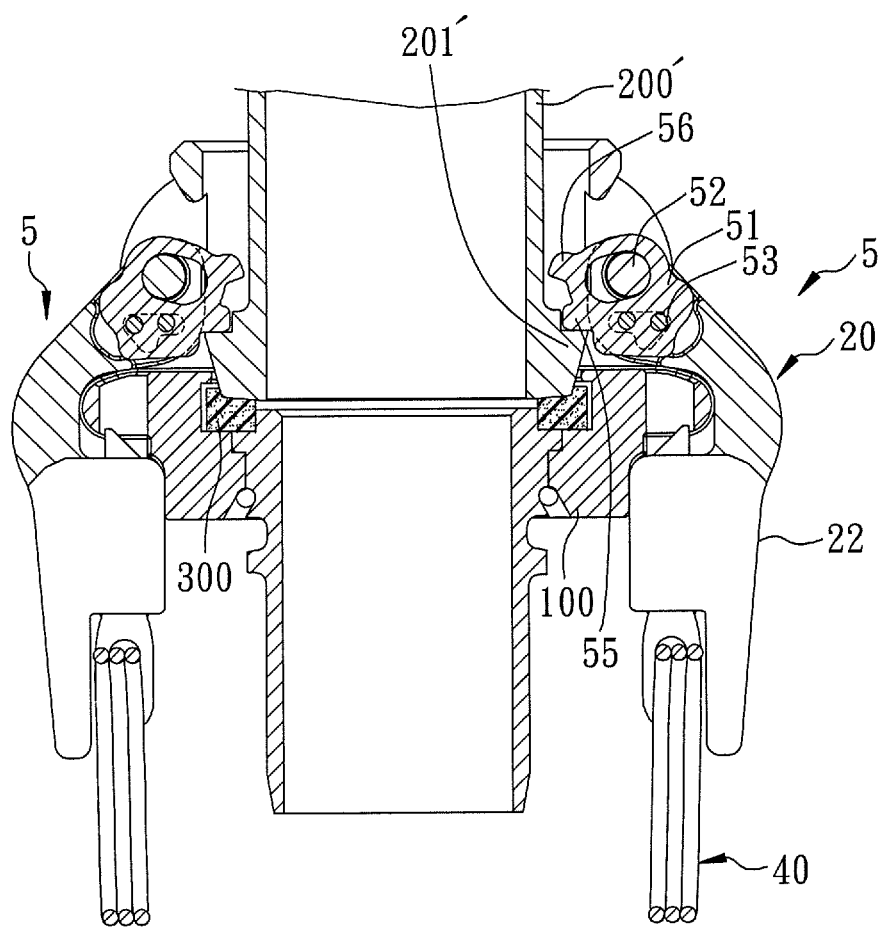
FIG. 31 is a sectional view of the fifteenth embodiment showing an actuatable lever at a fully locked position.
Figure 32:
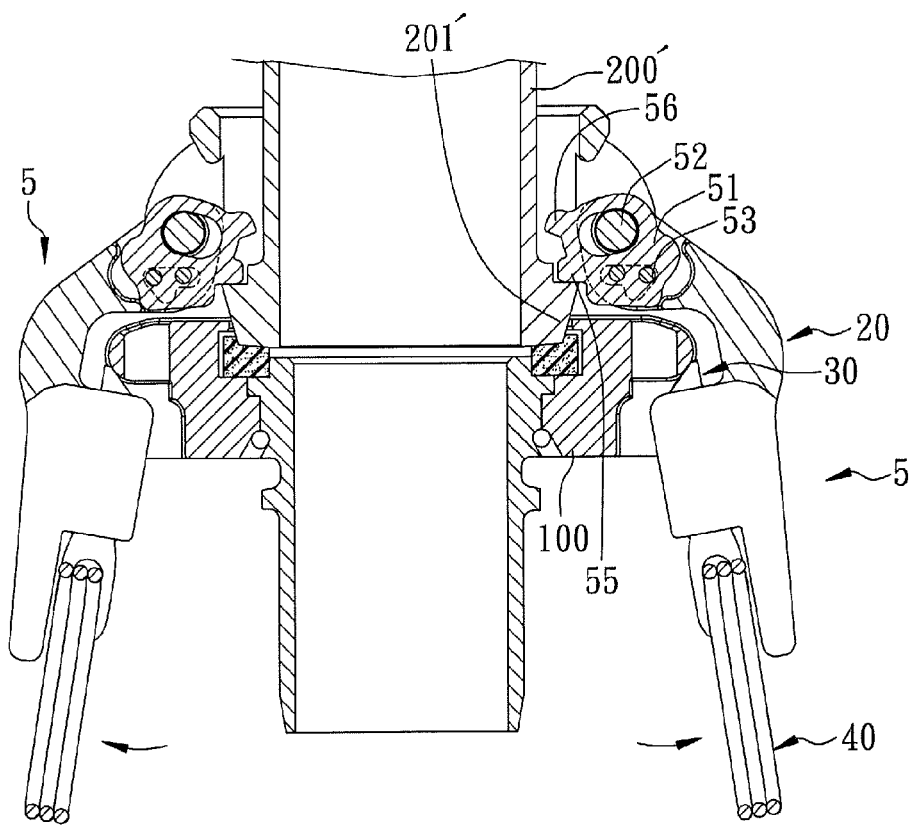
FIGS. 32 to 35 are respectively sectional views showing the actuatable lever is operated stagewise from the fully locked position to an unlocked position.
Figure 33:
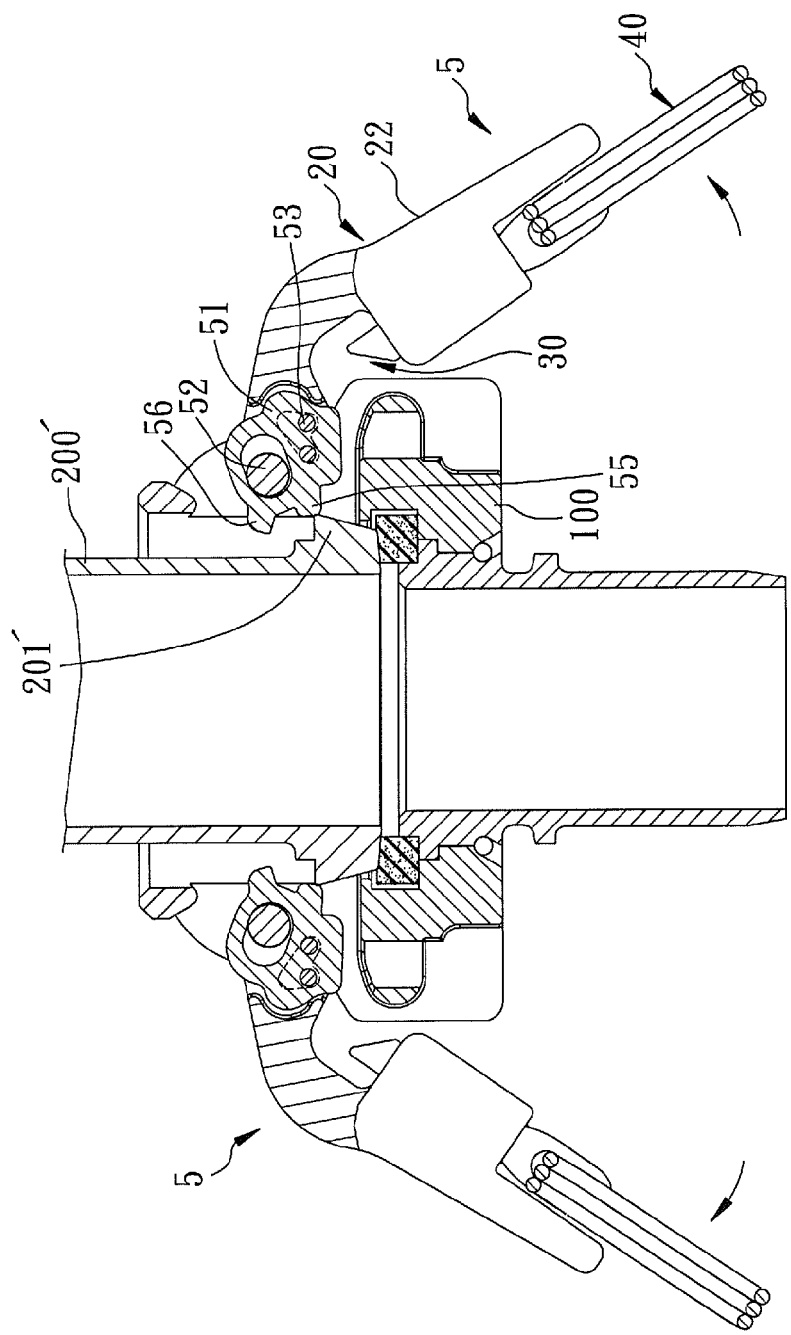
Figure 34:
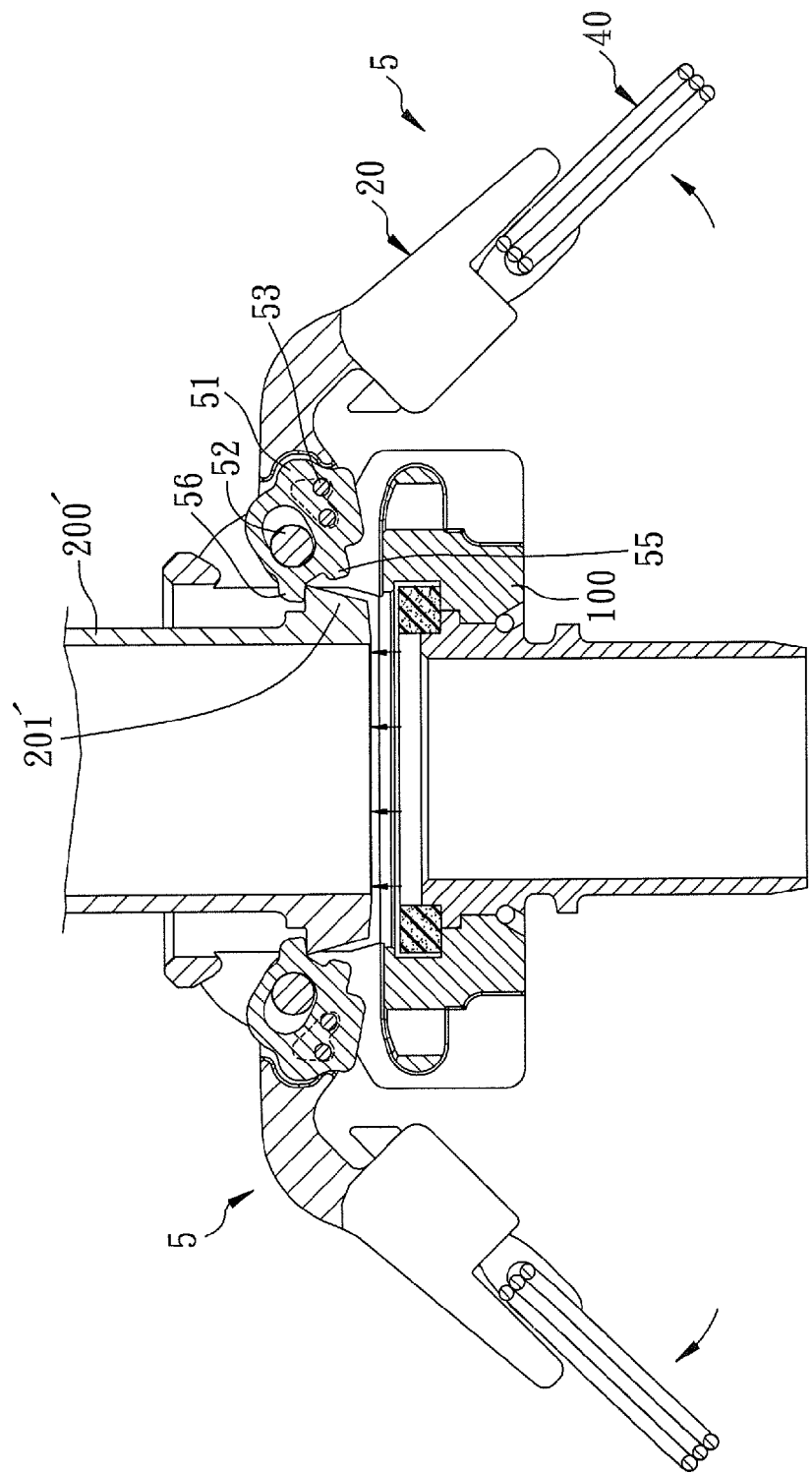
Figure 35:
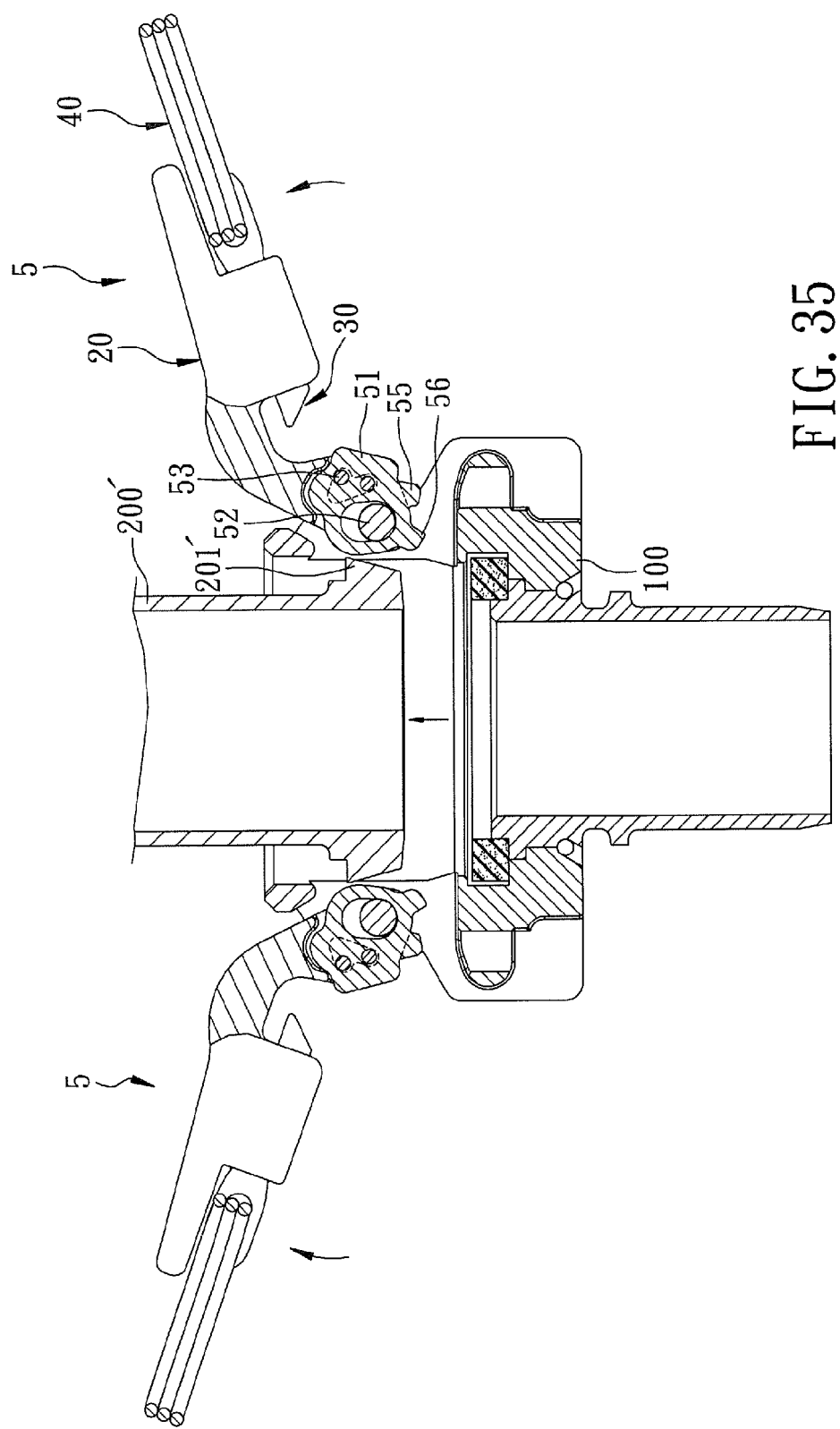
Figure 36:
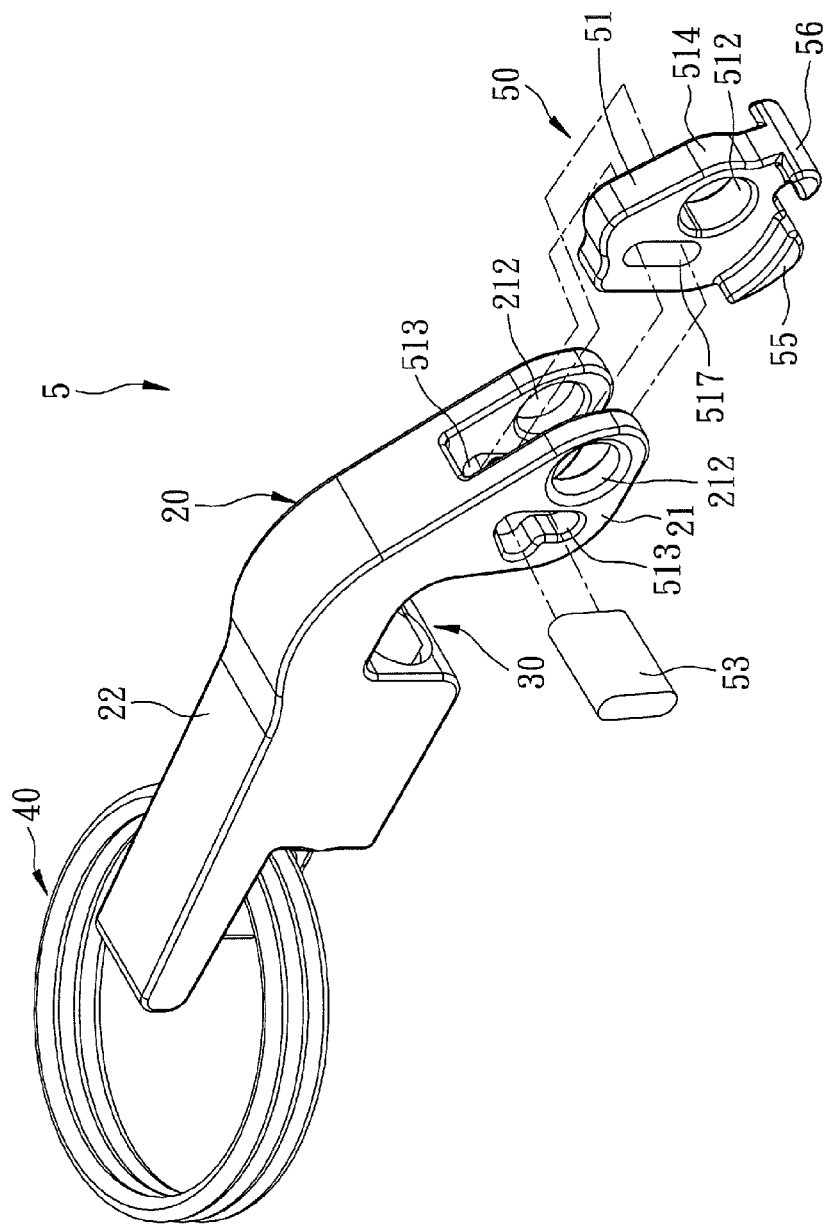
FIGS. 36 and 37 are exploded and perspective views of the sixteenth embodiment of this invention, respectively.
Figure 37:
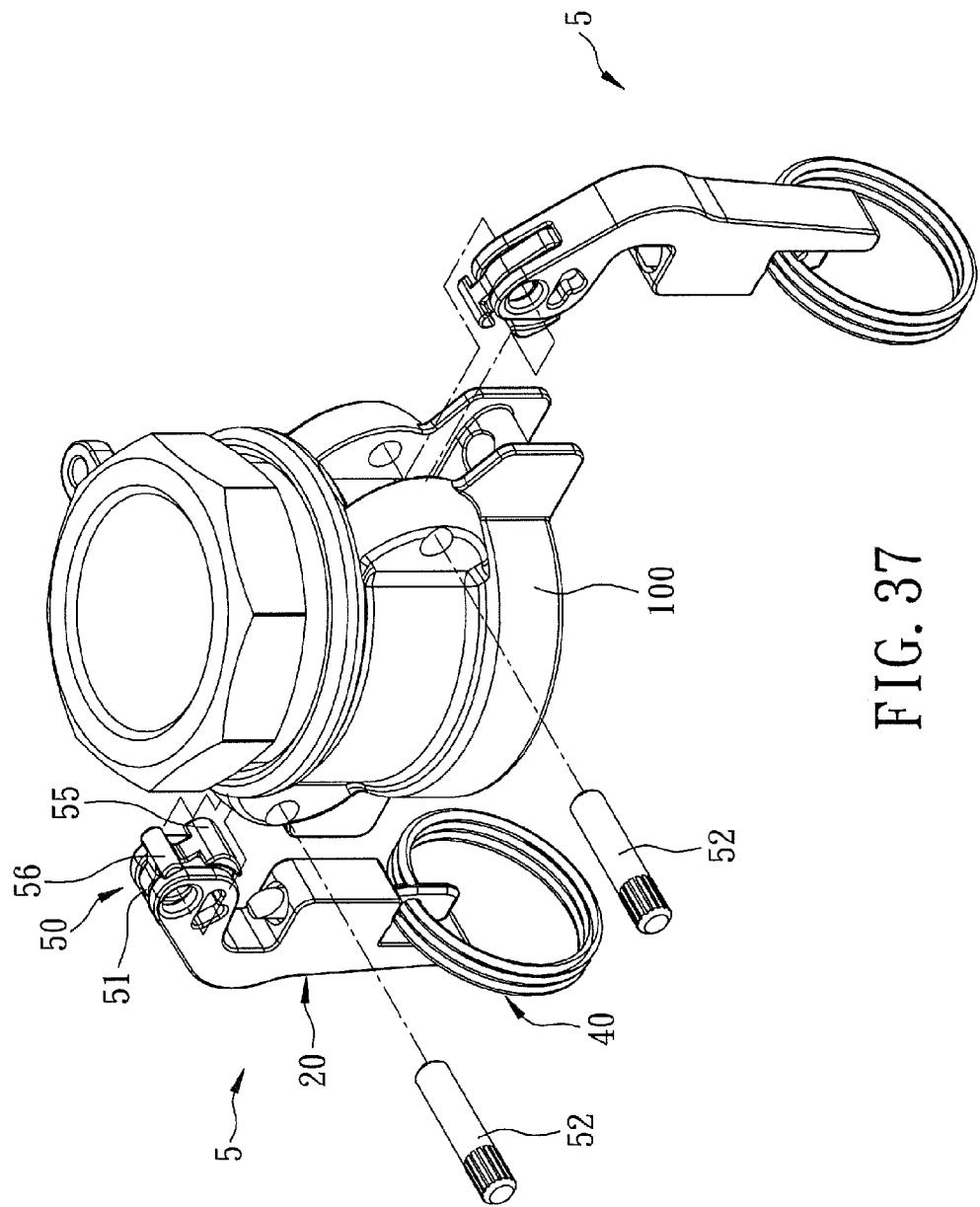
Figure 38:
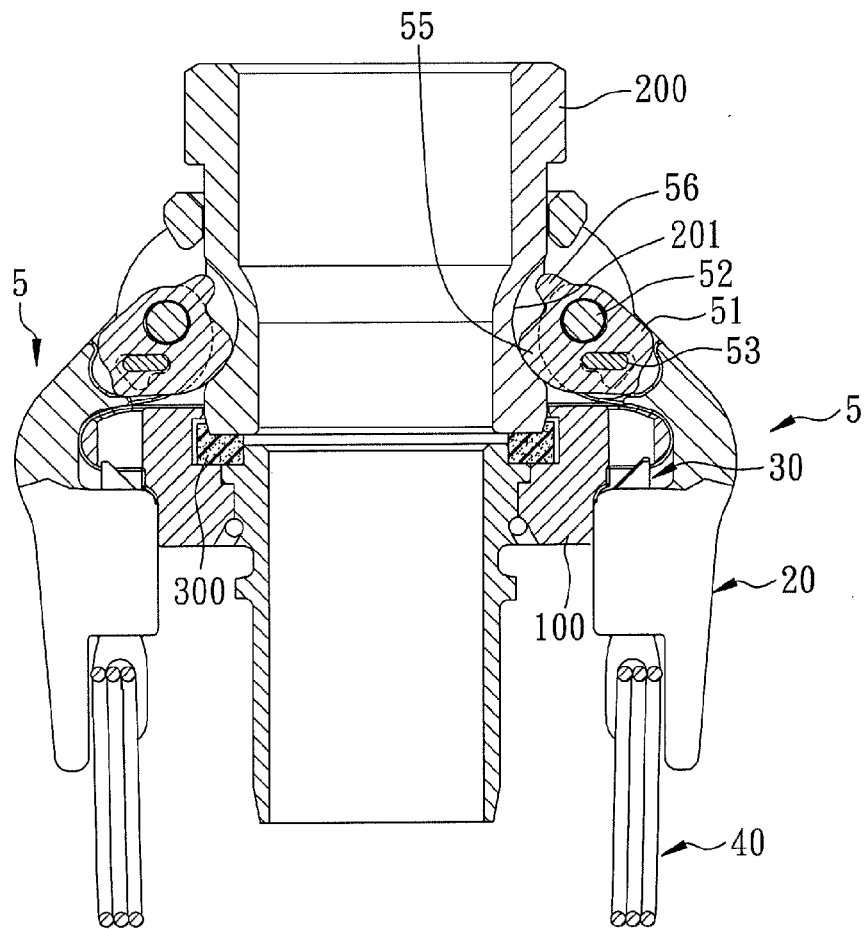
FIG. 38 is a sectional view of the sixteenth embodiment showing an actuatable lever at a fully locked position.
Figure 39:
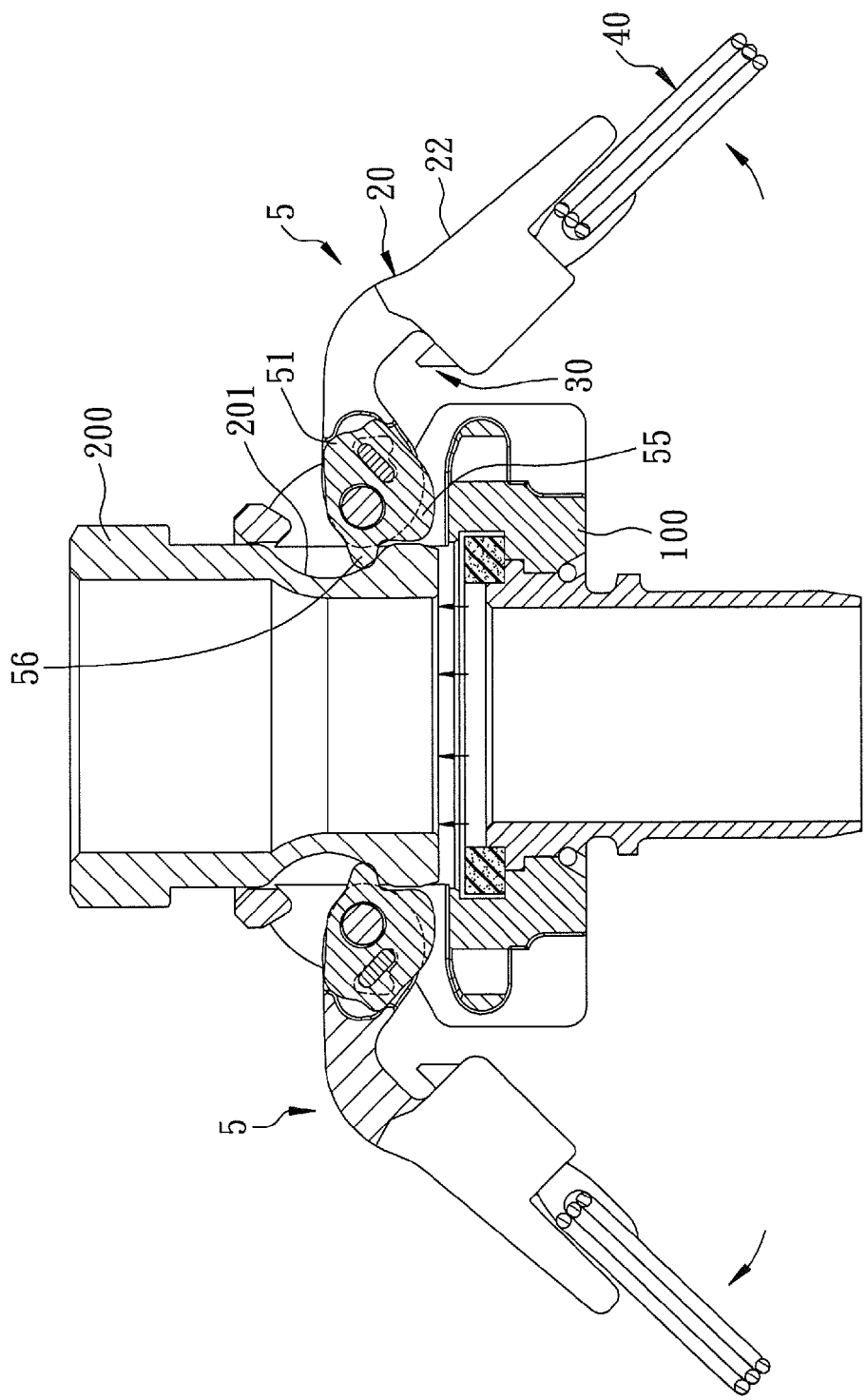
FIGS. 39 and 40 are respectively sectional views showing the actuatable lever is operated stagewise from the fully locked position to an unlocked position.
Figure 40:
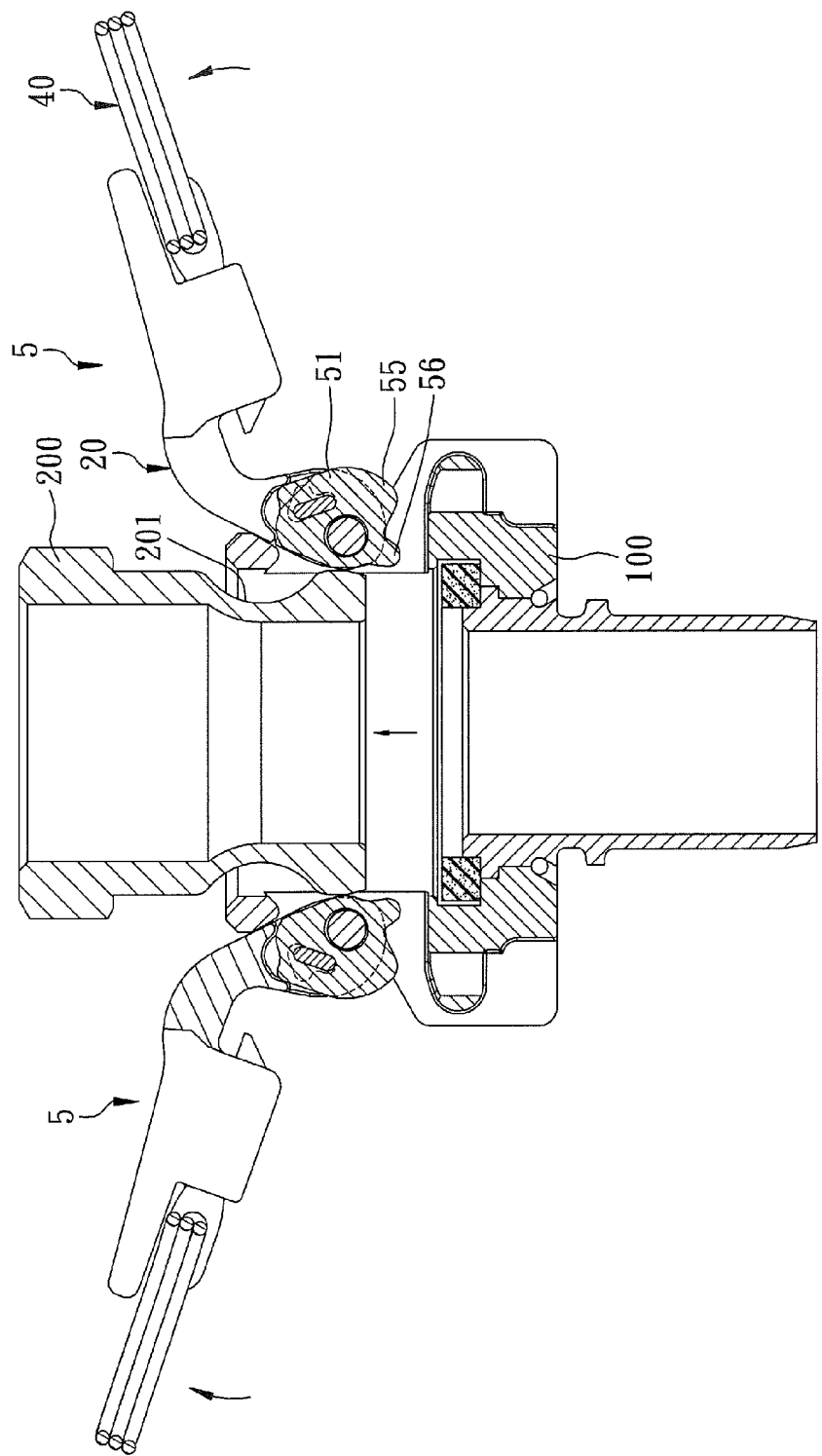

Referring to FIG. 28, in the fourteenth embodiment, each position self-adjusting assembly includes an elongated slot 513 formed in the corresponding angularly positioning member 51, and a peg 53 in the form of an elongated block integrally formed with the head 21 and extending from the mating surface 211 to be movably engaged in the elongated slot 513.

Referring to FIGS. 29 to 35, the fifteenth embodiment of the cam-lock actuating device 5 is shown to be slightly modified, in which the head 21 has a gap 215 for receiving an angularly positioning member 51, and two journalled holes 212 formed therethrough. The angularly positioning member 51 has an elongated hole 516 such that the pivot pin 52 extends through the elongated hole 516 to be journalled in the journalled holes 212 so as to permit movement of the angularly positioning member 51 relative to the head 21. Further, the position self-adjusting assembly includes two elongated slot 513 formed in the head 21 with a triangular shape, and two pegs 53 in the form of parallel pins movably engaged in the elongated slot 513 to be journalled in journalled holes 515 that are formed in the angularly positioning member 51. Moreover, the leading and trailing releasably retaining members 55, 56 further extend axially from the second forward surface region 514 of the angularly positioning member 51 so as to abut against the shoulder abutment 201' when the actuatable lever 20 is in the fully and partially locked positions, respectively.

Alternatively, referring to FIGS. 36 to 40, in the sixteenth embodiment, similar to the first embodiment, the angularly positioning member 51 has a journalled hole 512 such that the pivot pin 52 extends through the journalled holes 212, 512. Moreover, the position self-adjusting assembly includes a peg 53 in the form of an elongated block which is fittingly engaged with a fitting hole 517 formed in the angularly positioning member 51 and which is movably engaged in the elongated slots 513 formed in the head 51.

Figure 41:
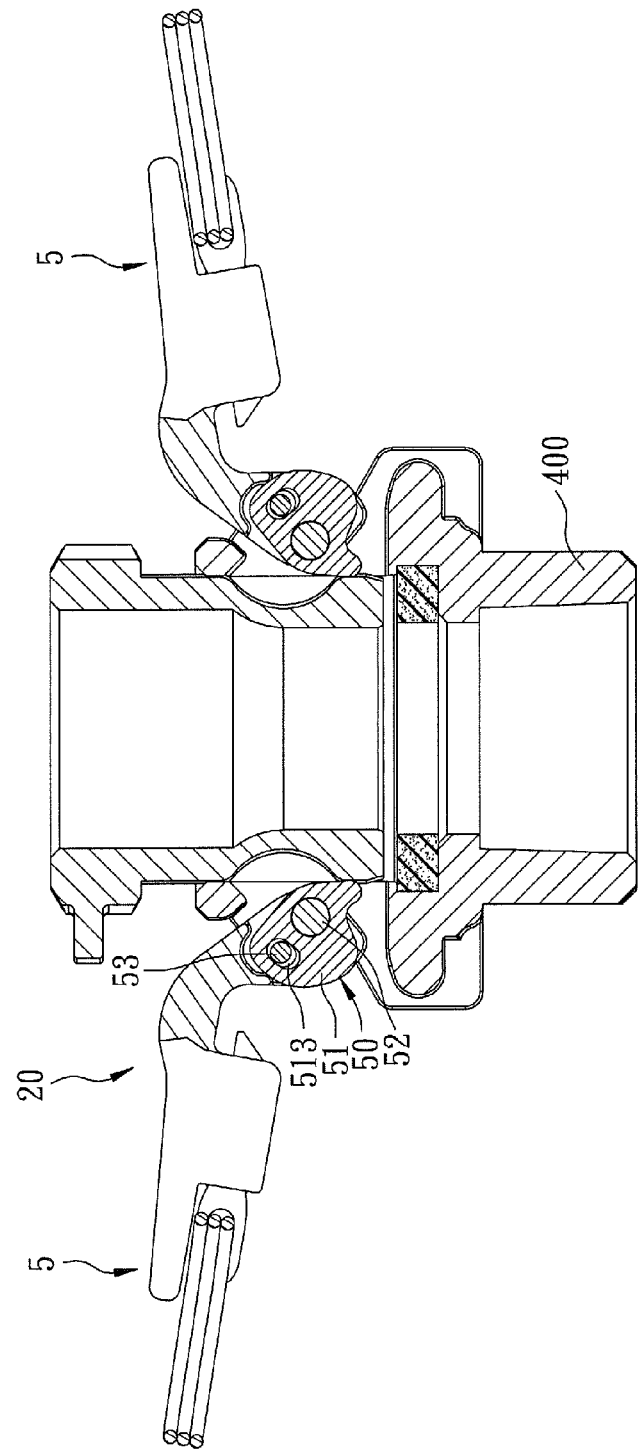
FIG. 41 is a sectional view showing the sixteenth embodiment mounted on a female tubular coupler of different dimension.

Besides, as shown in FIG. 41, with such tolerance connection between the elongated slot 513 and the peg 53, the cam-lock actuating device 5 of this invention can be used in conjunction with a female tubular coupler 400 of a different dimension.

Figure 42:
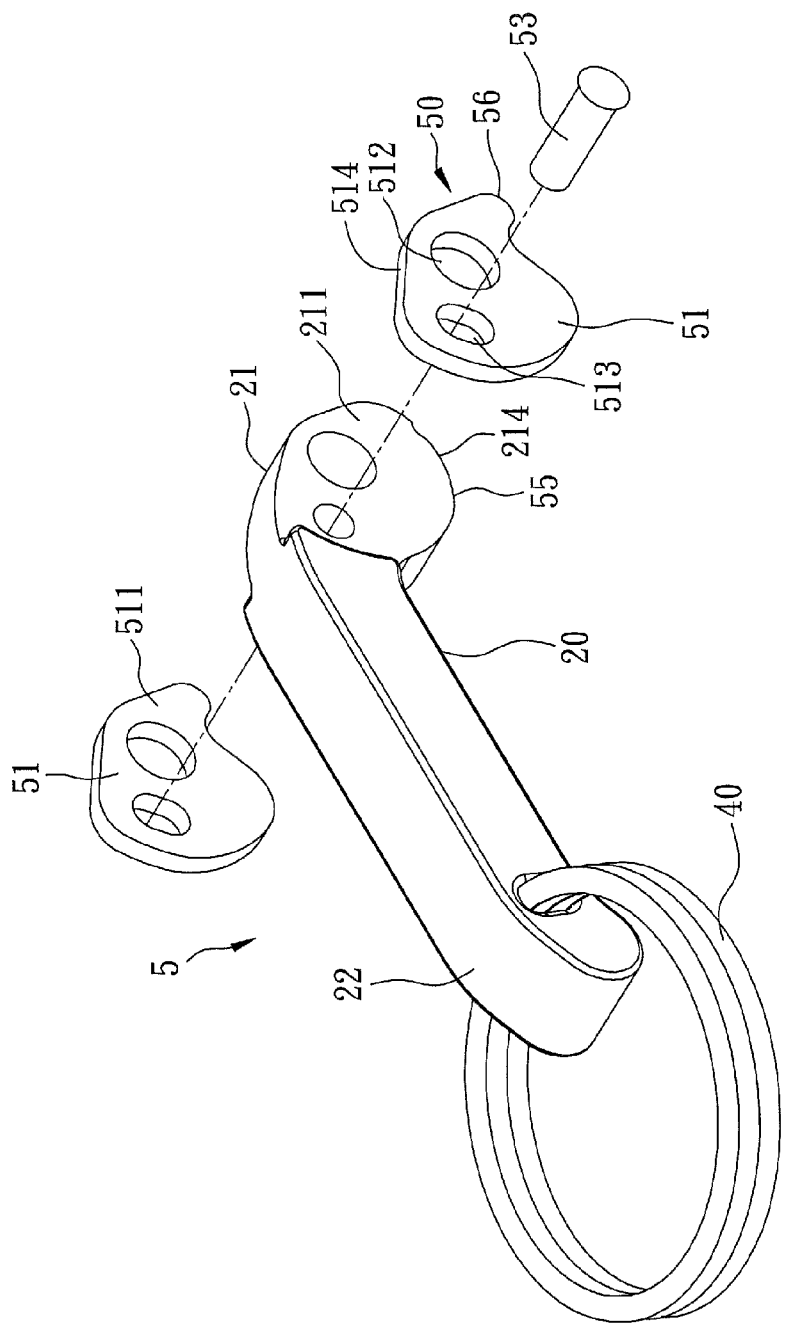
FIGS. 42 and 43 are exploded and perspective views of the seventeenth embodiment of this invention, respectively.
Figure 43:
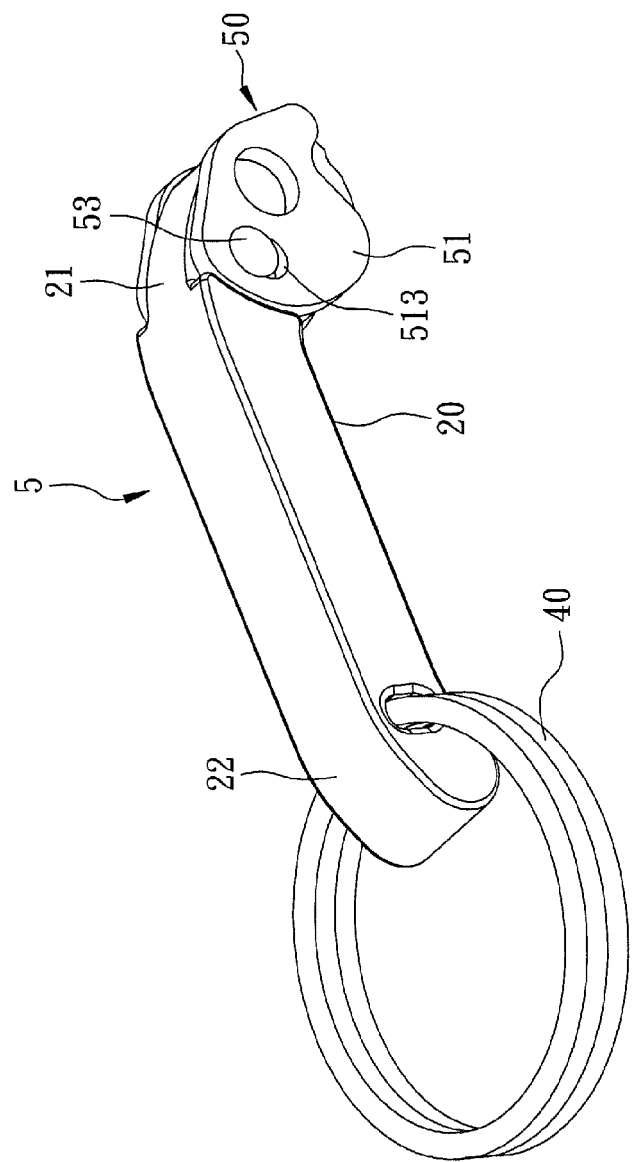

Referring to FIGS. 42 and 43, the seventeenth embodiment of the cam-lock actuating device 5 of this invention is shown to be a slight modification of the first embodiment and differs therefrom in that the pull ring 40 is attached to the arm 22 of the actuatable lever 20. Hence, the latch unit is dispensed with.

Figure 44:
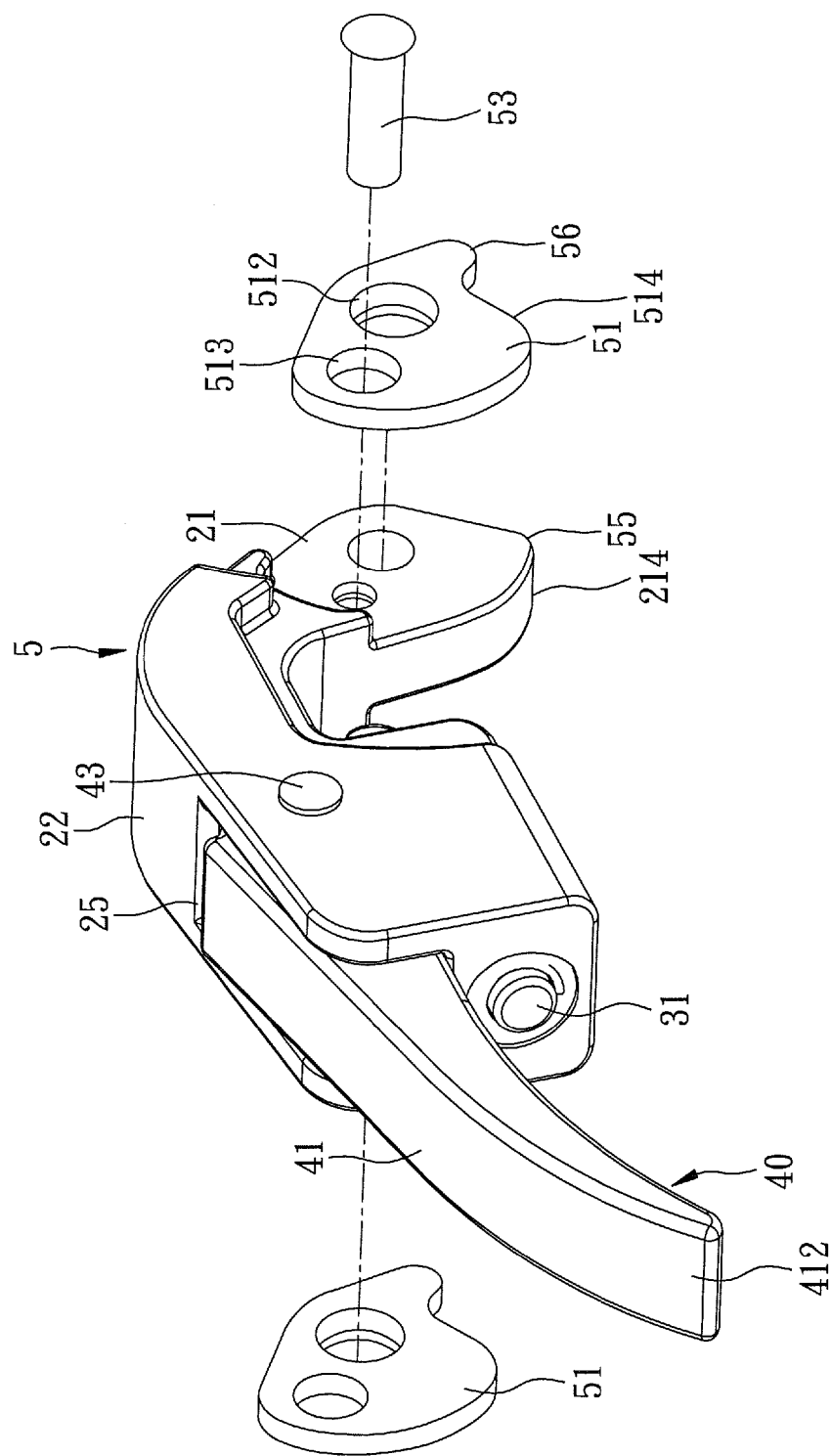
FIGS. 44 and 45 are exploded and perspective views of the eighteenth embodiment of this invention, respectively.
Figure 45:
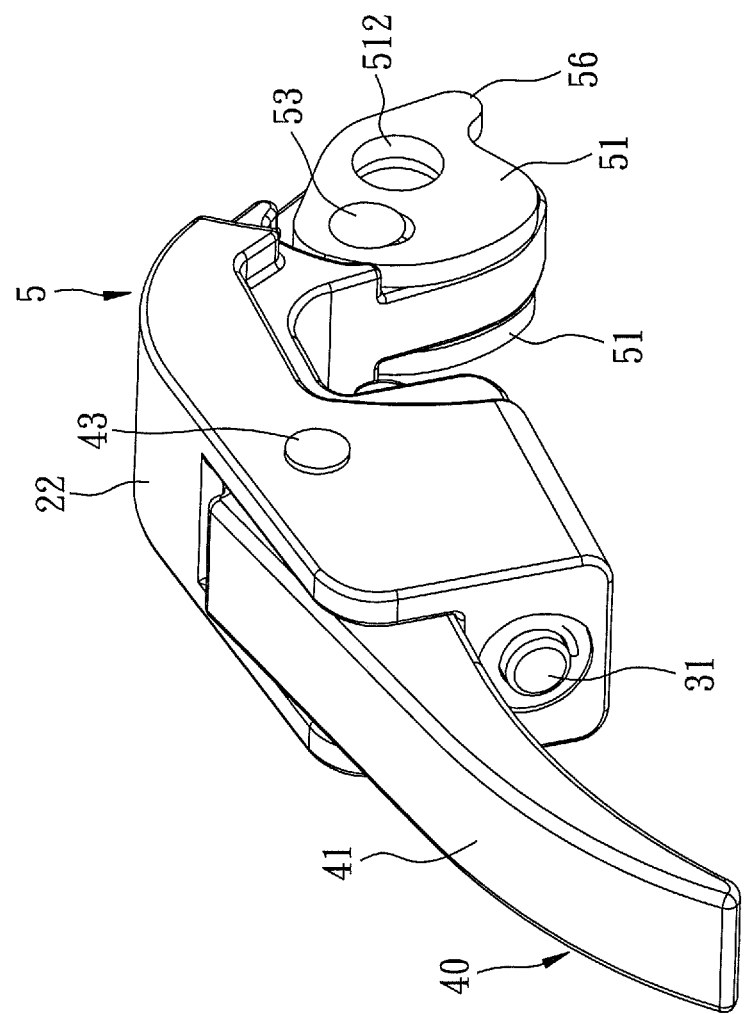

Alternatively, as shown in FIGS. 44 and 45, in the eighteenth embodiment, the manually operable actuator 40 includes a releasing lever 41. The releasing lever 41 has a fulcrum region which is disposed in a receiving concavity 25 formed in the arm 22 and which is pivotally mounted on the arm 22 by a fulcrum shaft 43, a weight end which is coupled to the latch 31, and a power end 412 that is manually operable to turn about the fulcrum shaft 43 so as to move the latch 31 from the latching position to the unlatching position.

Accordingly, the cam-lock actuating device 5 of this invention is suitable for use with locking coupling assemblies conforming to the standards EN-14420-7 (DIN 2828) and A-A-59326B.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A cam-lock actuating device for use in a locking coupling assembly that couples two tubular members, the locking coupling assembly including a female tubular coupler which has an inner peripheral seat, a male tubular coupler which has a tubular marginal portion that is configured to be received in the female tubular coupler and that has a retained region and a surrounding abutment edge, an elastomeric gasket which is disposed between the surrounding abutment edge and the inner peripheral seat to provide a fluid-tight seal when in a compressed state, a lug unit which is disposed on an outer tubular surface of the female tubular coupler, and a ledge which is disposed adjacent to the lug unit and which has a cavity, said cam-lock actuating device comprising:

an actuatable lever including a head which is adapted to be pivotally mounted on the lug unit about a pivot axis, and which has a first forward surface region that extends angularly about the pivot axis, and an arm which is opposite to said head in a lengthwise direction, and which is angularly displaceable among a fully locked position, where said arm is closer to the ledge, an unlocked position, where said arm is remote from the ledge, and a partially locked position that is between the fully locked position and the unlocked position;

an angularly positioning member which is coupled to said head to be angularly displaceable therewith about the pivot axis, and which has a second forward surface region that extends angularly about the pivot axis, said angularly positioning member and said head respectively having mating surfaces disposed normal to the pivot axis and joined to each other by a pivot pin that extends along the pivot axis and that is journalled on said mating surfaces;

leading and trailing releasably retaining members which are disposed to extend radially and independently from at least one of said first and second forward surface regions, and which are configured such that, when said actuatable lever is displaced to the fully locked position, said leading releasably retaining member is brought into frictional engagement with the retained region to thereby compress the elastomeric gasket into the compressed state, such that, when said actuatable lever is displaced to the partially locked position, said trailing releasably retaining member is brought into frictional engagement with the retained region so as to permit the elastomeric gasket to be held in a normal state, thereby relieving internal pressure in the tubular members, and such that, when said actuatable lever is displaced to the unlocked position, said trailing releasably retaining member is disengaged from the retained region so as to permit removal of the male tubular coupler from the female tubular coupler; and a position self-adjusting assembly disposed between said mating surfaces to permit movement of said angularly positioning member relative to said head, said position self-adjusting assembly including an elongated slot which is formed in one of said mating surfaces, and which extends angularly about the pivot axis, and a peg which extends from the other one of said mating surfaces along a moving axis that is parallel to the pivot axis and which is engaged in and movable relative to said elongated slot.

2. The cam-lock actuating device as claimed in claim 1, wherein said mating surfaces respectively have journalled holes which are configured such that said pivot pin fittingly extends therethrough to be secured to the lug unit.

3. The cam-lock actuating device as claimed in claim 1, further comprising:

a latch disposed in said arm and movable along the lengthwise direction between a latching position, where said latch is extendable into the cavity so as to hold said actuatable lever in the fully locked position, and an unlatching position, where said latch is disengaged from the cavity so as to permit said arm to be movable away from the fully locked position; and a manually operable actuator disposed to move said latch to the unlatching position.

4. The cam-lock actuating device as claimed in claim 3, wherein said manually operable actuator is in form of a pull ring which is attached to said latch.

* * * * *